US009507366B2

(12) United States Patent
Takahashi et al.

(10) Patent No.: US 9,507,366 B2
(45) Date of Patent: Nov. 29, 2016

(54) POWER SUPPLY CONTROL DEVICE

(71) Applicant: Semiconductor Energy Laboratory Co., Ltd., Atsugi-shi, Kanagawa-ken (JP)

(72) Inventors: Kei Takahashi, Kanagawa (JP); Masaaki Hiroki, Kanagawa (JP); Takehisa Sato, Kanagawa (JP); Roh Yamamoto, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 878 days.

(21) Appl. No.: 13/801,091

(22) Filed: Mar. 13, 2013

(65) Prior Publication Data
US 2013/0261835 A1    Oct. 3, 2013

(30) Foreign Application Priority Data

Mar. 29, 2012  (JP) ................................ 2012-076764

(51) Int. Cl.
*G06G 7/635* (2006.01)
*H02J 3/06* (2006.01)
*G05F 5/00* (2006.01)
(Continued)

(52) U.S. Cl.
CPC . *G05F 5/00* (2013.01); *H02J 9/00* (2013.01); *H02M 2001/008* (2013.01)

(58) Field of Classification Search
CPC ...... G05F 5/00; H02J 9/00; H02M 2001/008
USPC ....................................................... 700/297
See application file for complete search history.

(56) References Cited

U.S. PATENT DOCUMENTS 4,999,575 A    3/1991  Germer
5,731,856 A    3/1998  Kim et al.
(Continued)

FOREIGN PATENT DOCUMENTS

CN    101960719 A    1/2011
EP    0 420 535 A2    4/1991
(Continued)

OTHER PUBLICATIONS

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.
(Continued)

*Primary Examiner* — Ronald Hartman, Jr.
(74) *Attorney, Agent, or Firm* — Fish & Richardson P.C.

(57) ABSTRACT

An object is to reduce standby power in a data processing device, without loss of convenience, in a structure in which a power supply control device includes the data processing device. In a structure of a power supply control device which supplies power to an external device using a main switch, a data processing device is provided in the power supply control device to control the main switch; a sub-switch supplying power to the data processing device is provided; and a volatile memory unit and a nonvolatile memory unit are provided in the data processing device. Further, the sub-switch is off in a period in which data is stored in the nonvolatile memory unit of the data processing device, so that power supply to the data processing device is intermittently stopped.

20 Claims, 10 Drawing Sheets

(51) Int. Cl.
*H02J 9/00* (2006.01)
*H02M 1/00* (2006.01)

(56) References Cited

U.S. PATENT DOCUMENTS

| | | | |
|---|---|---|---|
| 5,744,864 | A | 4/1998 | Cillessen et al. |
| 6,294,274 | B1 | 9/2001 | Kawazoe et al. |
| 6,563,174 | B2 | 5/2003 | Kawasaki et al. |
| 6,727,522 | B1 | 4/2004 | Kawasaki et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 8,326,243 | B2 | 12/2012 | Nakagawa et al. |
| 8,787,083 | B2 * | 7/2014 | Fujita .................. G11C 7/20 365/154 |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0201294 | A1 * | 8/2007 | Ozawa .................. G11C 5/14 365/226 |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0133826 | A1 * | 6/2008 | Shimizu ................ G06F 9/4403 711/105 |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0179887 | A1 | 7/2009 | Chang et al. |
| 2009/0278122 | A1 | 11/2009 | Hosono et al. |
| 2009/0280600 | A1 | 11/2009 | Hosono et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0112959 | A1 | 5/2010 | Nakagawa et al. |
| 2011/0010493 | A1 | 1/2011 | Kimura et al. |
| 2011/0187348 | A1 | 8/2011 | Soneda et al. |
| 2012/0230078 | A1 * | 9/2012 | Fujita .................... G11C 14/00 365/65 |
| 2013/0040590 | A1 | 2/2013 | Nakagawa et al. |
| 2015/0326000 | A1 * | 11/2015 | Kanzaki ................ H02H 1/003 361/101 |

FOREIGN PATENT DOCUMENTS

| | | |
|---|---|---|
| EP | 1 737 044 A1 | 12/2006 |
| EP | 2 226 847 A2 | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 03-165268 A | 7/1991 |
| JP | 05-251705 A | 9/1993 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-172723 A | 6/2006 |
| JP | 2009-169381 A | 7/2009 |
| JP | 2009-206942 A | 9/2009 |
| JP | 2010-114484 A | 5/2010 |
| JP | 5140459 B2 | 2/2013 |
| TW | 200719134 | 5/2007 |

(56) References Cited

FOREIGN PATENT DOCUMENTS

| TW | 200934215 A | 8/2009 |
|---|---|---|
| WO | 2004/114391 A1 | 12/2004 |
| WO | 2009/107408 A1 | 9/2009 |

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.
Orita, M et al., "Mechanism of Electrical Conductivity of Transparent InGaZnO4," Phys. Rev. B (Physical Review. B), Jan. 15, 2000, vol. 61, No. 3, pp. 1811-1816.
Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.
Osada, T et al., "Development of Driver-Integrated Panel Using Amorphous In—Ga—Zn—Oxide TFT," AM-FPD '09 Digest of Technical Papers, Jul. 1, 2009, pp. 33-36.
Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.
Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.
Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.
Park, J et al., "High performance amorphous oxide thin film transistors with self-aligned top-gate structure," IEDM 09: Technical Digest of International Electron Devices Meeting, Dec. 7, 2009, pp. 191-194.
Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.
Park, J et al., "Amorphous Indium—Gallium—Zinc Oxide TFTs and Their Application for Large Size AMOLED," AM-FPD '08 Digest of Technical Papers, Jul. 2, 2008, pp. 275-278.
Park, S et al., "Challenge to Future Displays: Transparent AM-OLED Driven by PEALD Grown ZnO TFT," IMID '07 Digest, 2007, pp. 1249-1252.
Prins, M et al., "A Ferroelectric Transparent Thin-Film Transistor," Appl. Phys. Lett. (Applied Physics Letters), Jun. 17, 1996, vol. 68, No. 25, pp. 3650-3652.
Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.
Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.
Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.
Tsuda, K et al., "Ultra Low Power Consumption Technologies for Mobile TFT-LCDs," IDW '02 : Proceedings of the 9th International Display Workshops, Dec. 4, 2002, pp. 295-298.
Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.
Inoue, H et al., "A Novel Non-Volatile Memory Using Crystalline Oxide Semiconductor," The 59rd Spring Meeting of the Japan Society of Applied Physics and Related Societies Preliminary Drafts, 2012, No. 2, p. 653, no translation available.
Matsuzaki, T et al., "1Mb Non-Volatile Random Access Memory Using Oxide Semiconductor," IMW 2011 (3rd IEEE International Memory Workshop), May 22, 2011, pp. 185-188.
Nebashi, R et al., "Investigation of stand-by power free electric system using non-volatile CPU," IPSJ SIG Technical Report, Apr. 1, 2012, vol. 2012, No. 25, pp. 145-150 with English abstract, Information Processing Society of Japan, with English Abstract.
International Search Report, PCT Application No. PCT/JP2013/056220, dated Apr. 16, 2013, 4 pages.
Written Opinion, PCT Application No. PCT/JP2013/056220, dated Apr. 16, 2013, 6 pages.
Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.
Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.
Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.
Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.
Clark, S et al., "First Principles Methods Using CASTEP," Zeitschrift fur Kristallographie, 2005, vol. 220, pp. 567-570.
Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.
Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.
Dembo, H et al., "RFCPUs on Glass and Plastic Substrates Fabricated by TFT Transfer Technology," IEDM 05: Technical Digest of International Electron Devices Meeting, Dec. 5, 2005, pp. 1067-1069.
Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.
Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.
Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.
Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.
Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.
Hirao, T et al., "Novel Top-Gate Zinc Oxide Thin-Film Transistors (ZnO TFTs) for AMLCDs," Journal of the SID , 2007, vol. 15, No. 1, pp. 17-22.
Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

(56) References Cited

OTHER PUBLICATIONS

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.
Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.
Ikeda, T et al., "Full-Functional System Liquid Crystal Display Using CG-Silicon Technology," SID Digest '04 : SID International Symposium Digest of Technical Papers, 2004, vol. 35, pp. 860-863.
Janotti, A et al., "Native Point Defects in ZnO," Phys. Rev. B (Physical Review. B), 2007, vol. 76, No. 16, pp. 165202-1-165202-22.
Janotti, A et al., "Oxygen Vacancies in ZnO," Appl. Phys. Lett. (Applied Physics Letters), 2005, vol. 87, pp. 122102-1-122102-3.
Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.
Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.
Kanno, H et al., "White Stacked Electrophosphorecent Organic Light-Emitting Devices Employing MoO3 as a Charge-Generation Layer," Adv. Mater. (Advanced Materials), 2006, vol. 18, No. 3, pp. 339-342.
Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.
Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.
Kikuchi, H et al., "Polymer-Stabilized Liquid Crystal Blue Phases," Nature Materials, Sep. 1, 2002, vol. 1, pp. 64-68.
Kim, S et al., "High-Performance oxide thin film transistors passivated by various gas plasmas," The Electrochemical Society, 214th ECS Meeting, 2008, No. 2317, 1 page.
Kimizuka, N et al., "Spinel,YbFe2O4, and Yb2Fe3O7 Types of Structures for Compounds in the In2O3 and Sc2O3-A2O3-BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.
Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.
Kitzerow, H et al., "Observation of Blue Phases in Chiral Networks," Liquid Crystals, 1993, vol. 14, No. 3, pp. 911-916.
Kurokawa, Y et al., "UHF RFCPUs on Flexible and Glass Substrates for Secure RFID Systems," Journal of Solid-State Circuits , 2008, vol. 43, No. 1, pp. 292-299.
Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.
Lee, H et al., "Current Status of, Challenges to, and Perspective View of AM-OLED," IDW '06 : Proceedings of the 13th International Display Workshops, Dec. 7, 2006, pp. 663-666.
Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.
Lee, M et al., "15.4: Excellent Performance of Indium—Oxide-Based Thin-Film Transistors by DC Sputtering," SID Digest '09 : SID International Symposium Digest of Technical Papers, May 31, 2009, pp. 191-193.
Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.
Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.
Meiboom, S et al., "Theory of the Blue Phase of Cholesteric Liquid Crystals," Phys. Rev. Lett. (Physical Review Letters), May 4, 1981, vol. 46, No. 18, pp. 1216-1219.
Miyasaka, M, "SUFTLA Flexible Microelectronics on Their Way to Business," SID Digest '07 : SID International Symposium Digest of Technical Papers, 2007, vol. 38, pp. 1673-1676.
Mo, Y et al., "Amorphous Oxide TFT Backplanes for Large Size AMOLED Displays," IDW '08 : Proceedings of the 6th International Display Workshops, Dec. 3, 2008, pp. 581-584.
Nakamura, "Synthesis of Homologous Compound with New Long-Period Structure," NIRIM Newsletter, Mar. 1995, vol. 150, pp. 1-4 with English translation.
Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.
Nomura, K et al., "Thin-Film Transistor Fabricated in Single-Crystalline Transparent Oxide Semiconductor," Science, May 23, 2003, vol. 300, No. 5623, pp. 1269-1272.
Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.
Nomura, K et al., "Room-Temperature Fabrication of Transparent Flexible Thin-Film Transistors Using Amorphous Oxide Semiconductors," Nature, Nov. 25, 2004, vol. 432, pp. 488-492.
Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.
Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.
Oba, F et al., "Defect energetics in ZnO: A hybrid Hartree-Fock density functional study," Phys. Rev. B (Physical Review. B), 2008, vol. 77, pp. 245202-1-245202-6.
Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.
Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.
Taiwanese Office Action (Application No. 102109633) Dated Aug. 26, 2016.

* cited by examiner

POWER SUPPLY CONTROL DEVICE

TECHNICAL FIELD

The present invention relates to a power supply control device including a data processing function. Specifically, the present invention relates to a power supply control device including a data processing device which is capable of holding data even when not powered.

Note that a power supply control device in this specification refers to a device which is capable of controlling power supply to an external device such as an electronic device. For example, a multi-outlet power strip, an AC adapter, a socket of commercial power supply, and a device which is provided in an external device to supply power to a power supply circuit in the external device are power supply control devices.

BACKGROUND ART

In recent years, there have been growing interests in the global warming and the energy problem, and needs for a technology for reducing power consumption have been increasing. An electronic device for daily use in which power consumption is reduced without loss of convenience has been actively developed.

Reducing power consumption of an electronic device is important not only in a period during which the electronic device is operated but also in a period during which the electronic device is not operated. In other words, it is important to reduce power consumption in a standby state (hereinafter referred to as standby power).

In view of the problem of a reduction in standby power, Patent Document 1 focuses on a multi-tap that is a power supply control device and discloses the multi-tap in which a CPU (central processing unit), one of data processing devices, is provided. Patent Document 1 discloses a structure in which power supply is controlled in accordance with a status of use of an electronic device with the use of the CPU provided in the multi-tap.

REFERENCE

Patent Document

[Patent Document 1] Japanese Published Patent Application No. 2006-172723

DISCLOSURE OF INVENTION

In the structure of Patent Document 1, in which the CPU, one of data processing devices, is provided in the multi-tap that is a power supply control device, standby power of the electronic device can be reduced, but standby power of the CPU, one of a data processing devices provided in the power supply control device cannot be reduced.

Thus, an object of one embodiment of the present invention is to reduce standby power in a data processing device, without loss of convenience, in a structure of a power supply control device including the data processing device.

To achieve above object, in one embodiment of the present invention, a power supply control device which supplies power to an external device using a main switch (first switch) has the following structure: a data processing device is provided in the power supply control device to control the main switch; a sub-switch (second switch) supplying power to the data processing device is provided and a volatile memory unit and a nonvolatile memory unit are provided in the data processing device. Further, in one embodiment of the present invention, the sub-switch is off in a period in which data is stored in the nonvolatile memory unit of the data processing device, so that power supply to the data processing device is intermittently stopped.

One embodiment of the present invention is a power supply control device including a data processing device including a volatile memory unit and a nonvolatile memory unit, a first switch supplying power to an external device in response to control by the data processing device, and a second switch supplying power to the data processing device in response to control by the data processing device; the data processing device controls the first switch in accordance with a status of use of the external device; and the data processing device turns on the second switch in a period in which data is stored in the volatile memory unit, and turns off the second switch in a period in which data is stored in the nonvolatile memory unit.

One embodiment of the present invention is a power supply control device including a data processing device including a volatile memory unit, a nonvolatile memory unit, and a timer circuit, a first switch supplying power to an external device in response to control by the data processing device, and a second switch supplying power to the data processing device in response to control by the data processing device; the data processing device controls the first switch in accordance with a status of use of the external device; the data processing device turns on the second switch in a period in which data is stored in the volatile memory unit and turns off the second switch in a period in which data is stored in the nonvolatile memory unit; and the data processing device turns on the second switch in response to a signal from the timer circuit.

One embodiment of the present invention is a power supply control device including a data processing device including a volatile memory unit, a nonvolatile memory unit, and a timer circuit; a signal detection circuit detecting a signal from an external device; a human sensor circuit; a nonvolatile memory for storing information of the external device; a first switch supplying power to the external device in response to control by the data processing device; and a second switch supplying power to the data processing device in response to control by the data processing device. The nonvolatile memory is a circuit storing the signal from the external device that is detected in the signal detection circuit; the data processing device controls the first switch in accordance with a status of use of the external device; the data processing device turns on the second switch in a period in which data is stored in the volatile memory unit and turns off the second switch in a period in which data is stored in the nonvolatile memory unit; and the data processing device turns on the second switch in response to a signal from the signal detection circuit or the human sensor circuit or a signal from the timer circuit.

According to one embodiment of the present invention, it is preferable that a rectifier circuit, an AC/DC converter, and a DC/DC converter be provided between the second switch and the data processing device in the power supply control device.

According to one embodiment of the present invention, the power supply control device is preferably configured so that the data processing device turns off the second switch and performs control so as to stop operation of the AC/DC converter and operation of the DC/DC converter in the period in which data is stored in the nonvolatile memory unit.

According to one embodiment of the present invention, in the power supply control device, it is preferable that a capacitor be electrically connected to a wiring positioned between the DC/DC converter and the data processing device, the data processing device include a voltage monitor circuit detecting a potential of the wiring to which the capacitor is connected, and the voltage monitor circuit turn on the second switch depending on the detected potential.

According to one embodiment of the present invention, in the power supply control device, it is preferable that the nonvolatile memory unit include a circuit that holds the data by holding electrical charge using a transistor including an oxide semiconductor layer.

A power supply control device of one embodiment of the present invention includes a sub-switch supplying power to a data processing device and the data processing device controlling the sub-switch, whereby power supply to the data processing device can be stopped intermittently, so that a reduction in power consumption can be achieved. Further, the power supply control device of one embodiment of the present invention includes a volatile memory unit and a nonvolatile memory unit in the data processing device controlling the sub-switch, and data can be saved from the volatile memory unit to the nonvolatile memory unit at the time when the sub-switch is turned off; therefore, power supply to the data processing device can be stopped without a reduction in performance of the data processing device.

A power supply control device of one embodiment of the present invention includes a signal detection circuit detecting a signal from an external device and a human sensor circuit, and a main switch and a sub-switch can be turned on when it is necessary to supply power to an external device. Therefore, a data processing device can perform operations as needed, such as supply of power to the external device and supply of power to the data processing device, and thus power consumption can be reduced owing to a reduction in standby power of the external device and intermittent stop of power supply to the data processing device.

BEST MODE FOR CARRYING OUT THE INVENTION

Figure 1:
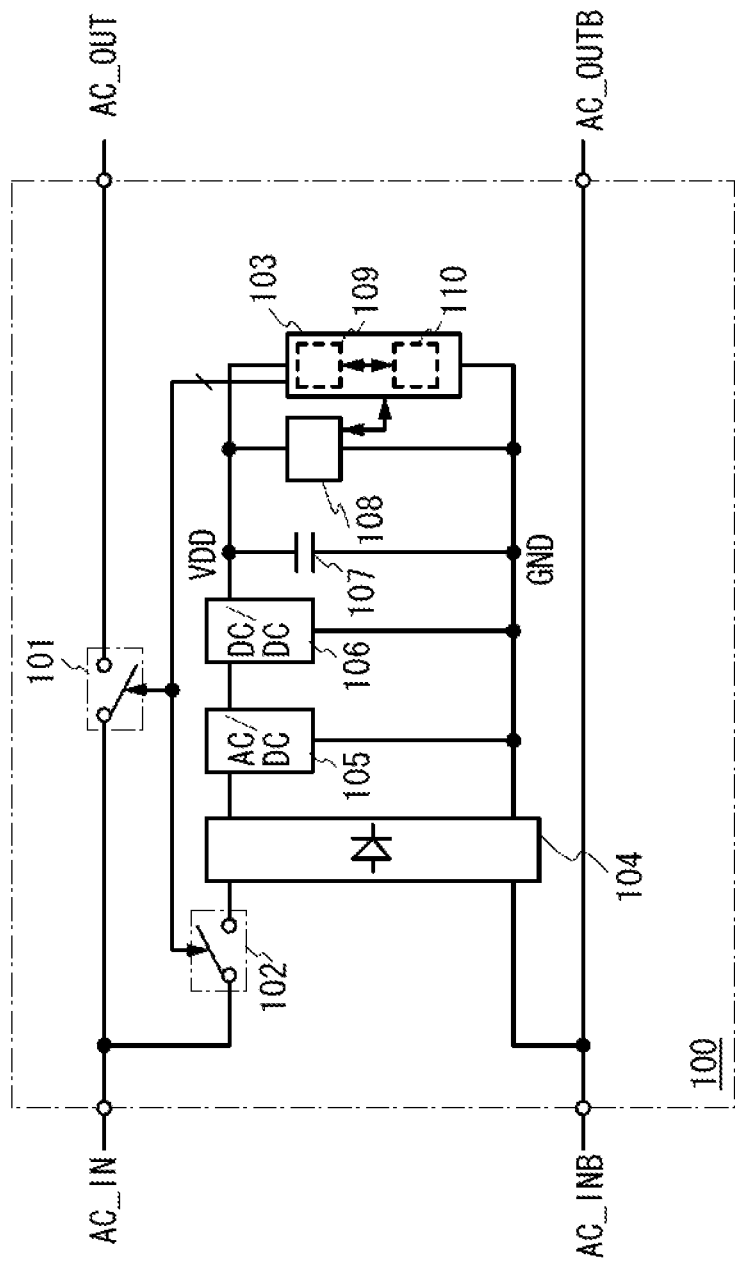
FIG. 1 is a block diagram illustrating a structure of a power supply control device.

Hereinafter, embodiments of the present invention will be described with reference to the accompanying drawings. However, the present invention can be carried out in many different modes, and it is easily understood by those skilled in the art that modes and details of the present invention can be modified in various ways without departing from the purpose and the scope of the present invention. Therefore, the present invention should not be construed as being limited to the following description of the embodiments. Note that in structures of the present invention described below, reference numerals denoting the same portions are used in common in different drawings.

In the reference drawings, the size, the thickness of layers, and/or regions may be exaggerated for clarity in some cases. Therefore, embodiments of the present invention are not limited to such scales. Note that diagrams are perspective views of ideal examples, and shapes or values are not limited to those illustrated in the diagrams. For example, the following can be included: variation in signal, voltage, or current due to noise; variation in signal, voltage, or current due to a difference in timing: or the like.

Note that in this specification and the like, a transistor is an element having at least three terminals of a gate, a drain, and a source. In addition, the transistor has a channel region between the drain (a drain terminal, a drain region, or a drain electrode) and the source (a source terminal, a source region, or a source electrode), and current can flow through the drain, the channel region, and the source.

Here, since a source and a drain may change depending on a structure, operating conditions, and the like of the transistor, it is difficult to define which is the source or the drain. Thus, a portion which functions as the source and a portion which functions as the drain are not called a source and a drain and one of the source and the drain is referred to as a first electrode and the other thereof is referred to as a second electrode in some cases.

In this specification, ordinal numbers such as "first", "second", and "third" are used in order to avoid confusion among components, and the terms do not limit the components numerically.

Note that in this specification, when it is described that "A and B are connected to each other", the case where A and B are electrically connected to each other is included in addition to the case where A and B are directly connected to each other. Here, expression "A is electrically connected to B" refers to a state where electric signals can be sent and received between A and B in the state where an object having a certain electric function exists between A and B.

Note that in this specification, terms such as "over" and "below" are used for convenience to describe a positional relation between components with reference to drawings. In addition, the positional relation between components is changed as appropriate depending on a view point from which the components are illustrated. Therefore, without limitation to terms used in this specification, it is possible to appropriately paraphrase the terms in accordance with the situation.

Note that the layout of circuit blocks in a block diagram in a drawing specifies the positional relation for description. Thus, even when a drawing shows that different functions are achieved in different circuit blocks, an actual circuit or region may be configured so that the different functions are achieved in the same circuit or region. Further, a function of each circuit block in a block diagram in a drawing is specified for description. Thus, even when one circuit block is illustrated, an actual circuit or region may be configured so that processing which is illustrated as being performed in the one circuit block is performed in a plurality of circuit blocks.

Embodiment 1

FIG. 1 is an example of a block diagram illustrating a structure of a power supply control device. A power supply control device 100 illustrated in FIG. 1 supplies power to an external device by outputting AC signals which are input from a terminal AC_IN and a terminal AC_INB, from a terminal AC_OUT and a terminal AC_OUTB.

The power supply control device 100 includes a main switch 101 (also referred to as a first switch), a sub-switch 102 (also referred to as a second switch), and a data processing device 103. The power supply control device 100 further includes a rectifier circuit 104, an AC/DC converter 105, a DC/DC converter 106, a capacitor 107, and a nonvolatile memory 108. The data processing device 103 includes a volatile memory unit 109 and a nonvolatile memory unit 110.

The main switch 101 is turned on, whereby the AC signals which are input from the terminal AC_IN and the terminal AC_INB are output from the terminal AC_OUT and the terminal AC_OUTB to the external device. The main switch 101 is turned off, whereby the output of the AC signals input from the terminal AC_IN and the terminal AC_INB, from the terminal AC_OUT and the terminal AC_OUTB to the external device is stopped. The main switch 101 is turned on and off by being controlled by the data processing device 103 in accordance with a status of use of the external device. Turning off the main switch 101 makes it possible to reduce the standby power of the external device.

The sub-switch 102 is turned on, whereby the AC signals which are input from the terminal AC_IN and the terminal AC_INB are output to the rectifier circuit 104. The sub-switch 102 is turned off, whereby the output of the AC signals, which are input from the terminal AC_IN and the terminal AC_INB, to the rectifier circuit 104 is stopped. The sub-switch 102 is turned on and off by being controlled by the data processing device 103.

As the main switch and the sub-switch which are described in this specification, a switch which is capable of mechanically operating, such as a relay circuit, or a switch which is capable of electrical operation, such as a thyristor or a power transistor, can be used.

The rectifier circuit 104 is a circuit for rectifying an AC signal which is input.

The AC/DC converter 105 is a circuit for smoothing a current which includes a ripple rectified in the rectifier circuit 104 into a direct current to adjust a power factor.

The DC/DC converter 106 is a circuit for converting the direct current signal obtained by the conversion in the AC/DC converter 105 into a direct current having a voltage at which the data processing device 103 can operate.

The capacitor 107 is provided to hold the voltage which is obtained in the DC/DC converter 106 and at which the data processing device 103 can operate.

The nonvolatile memory 108 is a circuit for storing data or a program to be processed in the data processing device 103. Note that examples of a memory element included in the nonvolatile memory 108 include a ferroelectric memory (FeRAM), a magnetic memory (MRAM), a phase-change memory (PRAM), and a resistive random access memory (ReRAM) which utilizes a Colossal Electro-Resistance, in addition to a flash memory. The memory element may be any memory element as long as it can hold data even when not powered.

The volatile memory unit 109 included in the data processing device 103 is a memory circuit which stores a result of arithmetic performed in the data processing device 103 when power is supplied, or data or a program which is used for the arithmetic. The memory circuit corresponds to a register which has a function of storing temporary data in the data processing device 103. For example, the volatile memory unit 109 can be formed using a flip-flop. The volatile memory unit 109 is preferably configured to store data at a higher speed than the nonvolatile memory unit 110. When the volatile memory unit 109 stores data at a high speed, the performance of the data processing device 103 can be improved.

The nonvolatile memory unit 110 included in the data processing device 103 is a circuit for storing the result of the arithmetic or the data or the program used for the arithmetic, which is stored in the data processing device 103 when the supply of power is not performed. For example, the nonvolatile memory unit 110 can be formed using a nonvolatile memory element.

The data processing device 103 controls on/off of the main switch 101, controls on/off of the sub-switch 102, and performs arithmetic processing which is necessary for operating the devices provided in the power supply control device 100.

For example, the data processing device 103 makes data in process saved from the volatile memory unit 109 to the nonvolatile memory unit 110 every certain period and turns off the sub-switch 102. In addition, the data processing device 103 operates to turn on the sub-switch 102, return the data that is saved in the nonvolatile memory unit 110 to the volatile memory unit 109, and perform arithmetic processing again.

In addition, when a sensor or a signal detection circuit is provided in the power supply control device 100, the data processing device 103 may be configured to perform arithmetic processing on the basis of a signal from an external device or the sensor and control on/off of the main switch 101 as needed.

In the above structure described in this embodiment, the sub-switch can be turned off in a period in which data is stored in the nonvolatile memory unit and data in arithmetic processing can be saved in the nonvolatile memory unit in the period. In the case where arithmetic processing restarts, the sub-switch is turned on and the saved data is returned, so that interrupted arithmetic processing can be operated. Therefore, it is possible to perform control so as to intermittently stop supplying power to the data processing device without a reduction in performance of the data processing device. According to one embodiment of the present invention, it is possible to intermittently stop supplying power to the data processing device; thus, a reduction in power consumption can be achieved.

Embodiment 2

In this embodiment, a structure is described, which is obtained such a manner that specific functions of monitoring power which is consumed in an external device and displaying, on a display portion, a saved power in a period during which a data processing device is stopped are added to the power supply control device described in Embodiment 1, and operation of the structure is described in detail.

<Structure of Power Supply Control Device>

Figure 2:
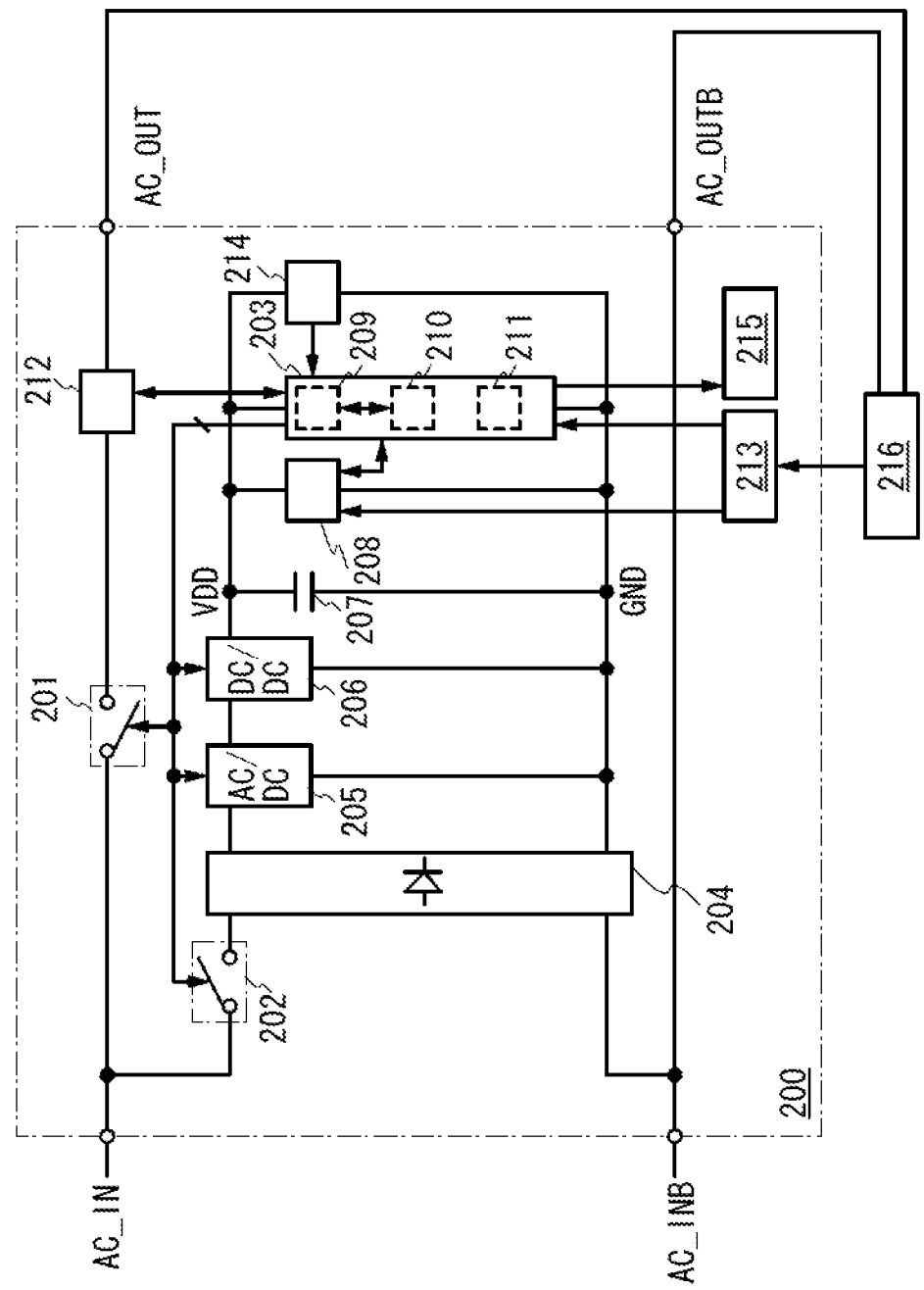
FIG. 2 is a block diagram illustrating a structure of a power supply control device.

FIG. 2 is an example of a block diagram illustrating a structure of a power supply control device 200 obtained by adding a plurality of structures to the power supply control device 100 of FIG. 1. The power supply control device 200 illustrated in FIG. 2 supplies power to the external device by outputting AC signals which are input from the terminal AC_IN and the terminal AC_INB, from the terminal AC_OUT and the terminal AC_OUTB.

The power supply control device 200 includes a main switch 201, a sub-switch 202, and a data processing device 203. The power supply control device 200 further includes a rectifier circuit 204, an AC/DC converter 205, a DC/DC converter 206, a capacitor 207, a nonvolatile memory 208, a current detection circuit 212, a signal detection circuit 213, a human sensor circuit 214, and a display portion 215. The data processing device 203 includes a volatile memory unit 209, a nonvolatile memory unit 210, and a timer circuit 211. In FIG. 2, the power supply control device 200 supplies power to an external device 216 which is provided outside the power supply control device 200.

The main switch 201 is turned on, whereby the AC signals which are input from the terminal AC_IN and the terminal AC_INB are output from the terminal AC_OUT and the terminal AC_OUTB to the external device. The main switch 201 is turned off, whereby the output of the AC signals input from the terminal AC_IN and the terminal AC_INB, from the terminal AC_OUT and the terminal AC_OUTB to the external device is stopped. The main switch 201 is turned on and off by being controlled by the data processing device 203 in accordance with a status of use of the external device.

The sub-switch 202 is turned on, whereby the AC signals which are input from the terminal AC_IN and the terminal AC_INB are output to the rectifier circuit 204. The sub-switch 202 is turned off, whereby the output of the AC signals, which are input from the terminal AC_IN and the terminal AC_INB, to the rectifier circuit 204 is stopped. The sub-switch 202 is turned on and off by being controlled by the data processing device 203.

The rectifier circuit 204 is a circuit for rectifying an AC signal which is input.

The AC/DC converter 205 is a circuit for smoothing a current which includes a ripple rectified in the rectifier circuit 204 into a direct current.

The DC/DC converter 206 is a circuit for converting the direct current obtained by the conversion in the AC/DC converter 205 into a direct current having a voltage at which the data processing device 203 can operate.

The capacitor 207 is provided to hold the voltage which is obtained in the DC/DC converter 206 and at which the data processing device 203 can operate. Note that in FIG. 2, the potential of a wiring which is connected to one electrode of the capacitor 207 is a high power supply potential VDD, and the potential of a wiring which is connected to the other electrode of the capacitor 207 is a ground potential GND.

The nonvolatile memory 208 is a circuit for storing data or a program to be processed in the data processing device 203. Note that examples of a memory element included in the nonvolatile memory 208 include a FeRAM, an MRAM, a PRAM, and a ReRAM, in addition to a flash memory. The memory element may be any memory element as long as it can hold data even when not powered.

The current detection circuit 212 is a circuit which detects a current value which is consumed in the external device 216, in response to an instruction from the data processing device 203. The detected current value that is consumed in the external device 216 is output to the data processing device 203, converted into an electric power value by arithmetic processing, and stored in the nonvolatile memory 208. Note that the current detection circuit 212 described in this embodiment is an example of a detection circuit which is provided to obtain data for arithmetic in the power supply control device, and can be replaced with a circuit for obtaining a different physical value.

The signal detection circuit 213 is a circuit which receives a signal from the external device 216 and outputs the received signal to the data processing device 203 or stores in the nonvolatile memory 208. For example, in the case where the signal received from the external device 216 is identification (ID) information of the external device 216, data relating to the ID information is stored in the nonvolatile memory 208. In the case where the signal received from the external device 216 is a signal for requiring displaying the amount of power consumed in the external device 216, the signal is output to the data processing device 203 and the data processing device 203 performs arithmetic of the amount of the power. Note that the signal is preferably sent from the external device 216 to the signal detection circuit 213 wirelessly using an electromagnetic wave or an infrared ray.

The human sensor circuit 214 is a circuit for detecting movement of a person around the power supply control device and movement in the periphery of the power supply control device and outputting as an electric signal. Specifically, a vibration sensor, a thermal sensor, a camera, or the like is provided and the movement of a person around the power supply control device or the movement in the periphery of the power supply control device is detected, and in response to the detection, an electric signal is output to the data processing device 203.

The display portion 215 displays the amount of the power consumption in the external device 216, which is obtained by the arithmetic processing by the data processing device 203. The display portion 215 may be a liquid crystal device, an EL display device, or a display device which performs display by lighting of an LED. Note that the display portion 215 described in this embodiment is an example of a device for outputting data obtained by the arithmetic processing by the data processing device 203, and can be replaced with a device which uses data obtained by arithmetic processing.

The volatile memory unit 209 included in the data processing device 203 is a memory circuit which stores a result of arithmetic performed in the data processing device 203 when power is supplied, or data or a program which is used for the arithmetic. The memory circuit corresponds to a register which has a function of storing temporary data in the data processing device 203. For example, the volatile memory unit 209 can be formed using a flip-flop. The volatile memory unit 209 is preferably configured to store data at a higher speed than the nonvolatile memory unit 210. When the volatile memory unit 209 stores data at a high speed, the performance of the data processing device 203 can be improved.

The nonvolatile memory unit 210 included in the data processing device 203 is a circuit for storing the result of the arithmetic or the data or the program used for the arithmetic, which is stored in the data processing device 203 when the supply of power is not performed. For example, the nonvolatile memory unit 210 can be formed using a nonvolatile memory element.

The timer circuit 211 included in the data processing device 203 is a circuit which generates a signal for making the data processing device 203 perform operation for turning on the sub-switch 202. The timer circuit 211 can be formed using a watchdog circuit.

Note that power supply to the timer circuit 211 is performed separately from power supply to the volatile memory unit 209 and the nonvolatile memory unit 210. In other words, the timer circuit 211 can operate even when the power supply to the volatile memory unit 209 and the nonvolatile memory unit 210 is stopped. The timer circuit 211 can operate using the high power supply potential VDD and the ground potential GND held by the capacitor 207, as a power supply voltage. Therefore, on/off of the sub-switch 202 can be controlled every certain period separately from arithmetic processing.

<Structure of Data Processing Device>

Next, the data processing device 203 is described using a block diagram.

Figure 3:
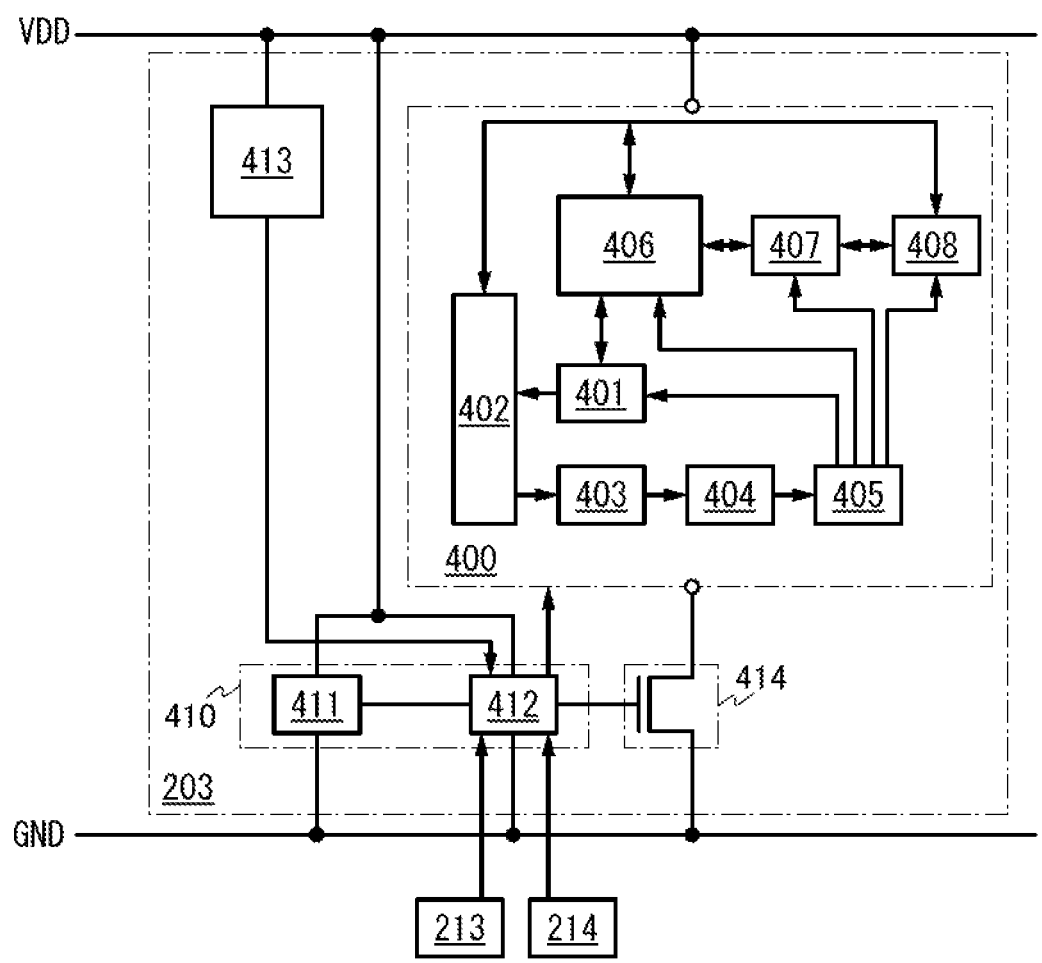
FIG. 3 is a block diagram illustrating a structure of a data processing device.

FIG. 3 illustrates an example of the block diagram of the data processing device 203. In the block diagram illustrated in FIG. 3, the data processing device 203 is largely divided into a data processor 400, a watchdog circuit 410, a voltage monitor circuit 413, and a power transistor 414. The data processor 400 includes an address management section 401, a program memory 402, an instruction register 403, an instruction decoder 404, a control section 405, a register group 406, an arithmetic logic unit (ALU) 407 corresponding to an arithmetic unit, and an arithmetic register 408. The watchdog circuit 410 includes a counter circuit 411 and a control circuit 412.

Note that the volatile memory unit 209 and the nonvolatile memory unit 210 correspond to circuits used for the instruction register 403, the register group 406, and the arithmetic register 408 included in the data processor 400, although the relation is not illustrated.

The address management section 401 included in the data processor 400 specifies an address for reading an instruction from the program memory 402 and takes the instruction in the instruction register 403 by being controlled by the control section 405. Further, the address management section 401 manages an address of the register group 406.

The program memory 402 included in the data processor 400 stores a plurality of instructions to be taken in the instruction register 403. The address is specified, whereby the instruction is taken in the instruction register via a data bus.

The instruction register 403 included in the data processor 400 receives the instruction taken therein from the program memory 402 and outputs the instruction to the instruction decoder 404.

The instruction decoder 404 included in the data processor 400 decodes the instruction which the instruction decoder 404 has received from the instruction register 403, to make the control section 405 perform processing.

The control section 405 included in the data processor 400 takes control so that data stored in the register group 406 or the arithmetic register 408 is read out to the ALU 407 in response to the decoded instruction, and makes the ALU 407 perform arithmetic processing based on the instruction. Note that examples of the data on which the arithmetic processing is performed in the block diagram in FIG. 2 include a signal based on the current value detected in the current detection circuit 212, ID information of the external device 216 stored in the nonvolatile memory 208, a program for performing display on the display portion 215, and the like.

The register group 406 included in the data processor 400 temporarily stores data used for an instruction and a result of arithmetic.

The ALU 407 included in the data processor 400 performs arithmetic processing on the data which is input from the register group 406 or the arithmetic register 408 and stores the data again in the register group 406 or the arithmetic register 408.

The arithmetic register 408 included in the data processor 400 takes the data therein from the register group 406 or the program memory 402 and outputs the data to the ALU 407.

The operation of the data processor 400 described above can be largely divided into operations of fetching, decoding, executing, and writing back. Specifically, in the fetch processing, the address of the program memory 402 is specified and an instruction is taken in the instruction register 403. In the decode processing, the instruction taken in the instruction register 403 is translated in the instruction decoder 404. By the control section 405, arithmetic operation is performed by controlling the data stored in the register group 406 and the ALU 407 in accordance with the translated instruction. In the write back processing, a result which is obtained from the arithmetic operation of the ALU 407 is written in the register group 406 and the written data is returned to the arithmetic register 408.

Note that when the data processor 400 performs arithmetic processing, each of the instruction register 403, the register group 406, and the arithmetic register 408 to which data is written is configured to temporarily store data in a volatile memory unit of the register. In addition, when power supply to the data processor 400 is stopped, each of the instruction register 403, the register group 406, and the arithmetic register 408 is configured to save the data of the volatile memory unit to the nonvolatile memory unit in the register to store the data.

The counter circuit 411 included in the watchdog circuit 410 is a circuit for outputting a signal to the control circuit 412 every certain period on the basis of a reference clock signal from a crystal oscillator or the like.

The control circuit 412 included in the watchdog circuit 410 controls a conduction state of the power transistor 414, controls on/off of the main switch 201 and the sub-switch 202, and controls whether or not a signal for saving data of the volatile memory unit in each register included in the data processor 400 to the nonvolatile memory unit is output, in response to a signal received from the signal detection circuit 213 or the human sensor circuit 214, a signal from the counter circuit 411, or a signal from the voltage monitor circuit 413.

The voltage monitor circuit 413 is a circuit for controlling a potential of a wiring supplied with the high power supply potential VDD so that the potential is not less than a driving voltage of the data processing device 203, by monitoring the potential. Specifically, in the case where a reference potential which is slightly higher than the driving voltage and the high power supply potential VDD are compared with each other using a comparator and the high power supply potential VDD is less than the reference potential, a signal is output to the control circuit 412.

The power transistor 414 is a transistor which is switched to a conduction state and a non-conduction state in response to the signal from the control circuit 412 and controls whether or not the power supply to the data processor 400 is stopped. Note that although the power transistor 414 is provided on the ground potential GND side in FIG. 3, the power transistor 414 may be provided on the high power supply potential VDD side.

Note that power supply to the watchdog circuit 410 and the voltage monitor circuit 413 is performed separately from the power supply to the data processor 400. In other words, the watchdog circuit 410 and the voltage monitor circuit 413 can operate even when the power supply to the data processor 400 is stopped because of the non-conduction state of the power transistor 414. The watchdog circuit 410 and the voltage monitor circuit 413 can operate using the high power supply potential VDD and the ground potential GND held by the capacitor 207, as a power supply voltage. Therefore, separately from the arithmetic processing in the data processor 400, on/off of the sub-switch 202 can be controlled in accordance with a period which is set in the watchdog circuit 410 or a change in potential in the voltage monitor circuit 413.

The data processing device 203 described above includes the voltage monitor circuit 413 which continuously monitors the potential of the wiring supplied with the high power supply potential VDD, whereby the data processing device 203 can perform operation for turning on the sub-switch before operation failure due to a drop in the potential of the higher power supply potential VDD. Further, the data processing device 203 includes the watchdog circuit 410 which can output a signal every certain period, whereby the data processing device 203 can perform operation for turning on the sub-switch before operation failure due to a drop in the potential of the higher power supply potential VDD. Further, since the conduction state of the power transistor 414 is controlled in response to the signal received from the signal detection circuit 213 or the human sensor circuit 214, the signal from the timer circuit 211, or the signal from the voltage monitor circuit 413 in the data processing device 203, whereby the data processing device 203 can perform operation for turning on the sub-switch in accordance with a status of use.

<Structure of Volatile Memory Unit and Nonvolatile Memory Unit>

Figure 4A:
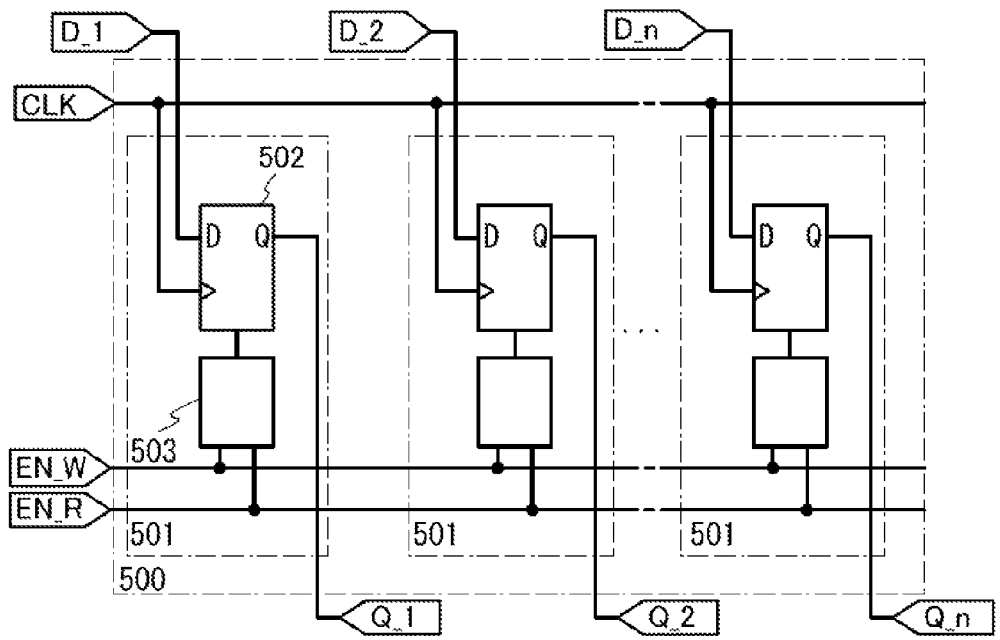
FIGS. 4A and 4B are block diagrams illustrating a structure of a volatile memory unit and a nonvolatile memory unit included in a data processing device.
Figure 4B:
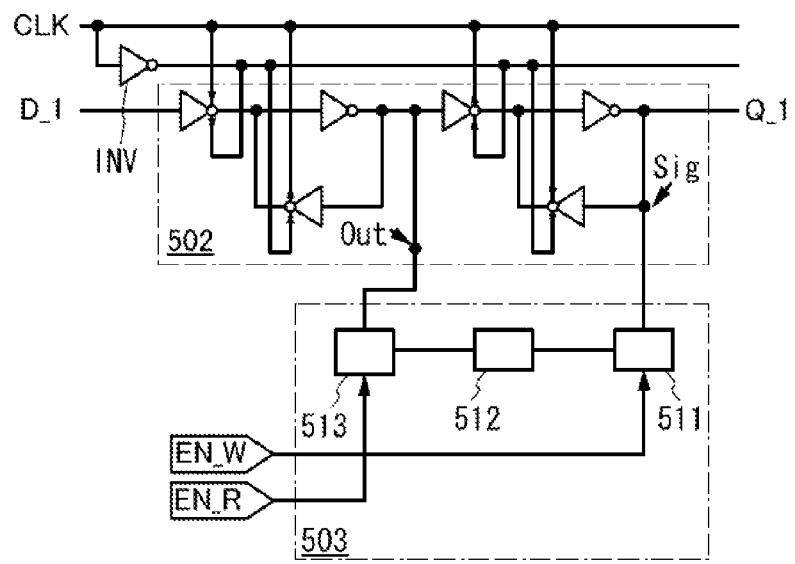

Next, a structure of a volatile memory unit and an nonvolatile memory unit which can be used for each of the instruction register 403, the register group 406, and the arithmetic register 408 included in the data processor 400 is described. FIGS. 4A and 4B illustrate an example of a block diagram of a register including a volatile memory unit and a nonvolatile memory unit.

In a register 500, a volatile memory unit and a nonvolatile memory unit are provided as a set. A unit memory section including the set of the volatile memory unit and the nonvolatile memory unit is capable of storing one-bit or plural-bit data. The register 500 is described as the one which stores n-bit (n is a natural number) data in FIG. 4A, and then a structure of the unit memory section which stores one-bit data is described in FIG. 4B.

FIG. 4A illustrates an example of a block diagram of a register including volatile memory units and nonvolatile memory units. The register 500 illustrated in FIG. 4A includes n unit memory sections 501.

The unit memory sections 501 each include a volatile memory unit 502 and a nonvolatile memory unit 503.

For example, the volatile memory unit 502 can be formed using a flip-flop. In FIG. 4A, a D-flip-flop is illustrated as an example of the flip-flop. Power is supplied from the high power supply potential VDD and the ground potential GND to the volatile memory unit 502, and a clock signal CLK and data D_1 to D_n are input to the volatile memory unit 502. Another signal for control may be input in accordance with the circuit configuration of the volatile memory unit 502. The volatile memory units 502 hold the data D_1 to D_n input into terminals D and output the data Q_1 to Q_n from output terminals Q in synchronization with the clock signal.

Power is supplied from the high power supply potential VDD and a low power supply potential VSS to the nonvolatile memory unit 503, and a writing control signal EN_W, a reading control signal EN_R, and the data which is stored in the volatile memory unit 502 are input to the nonvolatile memory unit 503. Another signal for control may be input in accordance with the circuit configuration of the nonvolatile memory unit 503. The nonvolatile memory unit 503 writes and reads the data by control of the writing control signal EN_W and the reading control signal EN_R.

As a nonvolatile memory element included in the nonvolatile memory unit 503, a flash memory, a FeRAM, an MRAM, a PRAM, a ReRAM, or the like can be used.

It is particularly preferable to use, as the nonvolatile memory element used for the nonvolatile memory unit 503, a nonvolatile memory element including a circuit which holds data by holding electrical charge with the use of a transistor including an oxide semiconductor layer. When the transistor including an oxide semiconductor layer is used for forming the nonvolatile memory unit 503, the nonvolatile memory unit 503 can be manufactured through a manufacturing process of the transistor; thus, cost for manufacturing the storage circuit can be reduced.

The writing control signal EN_W and the reading control signal EN_R are signals for controlling writing and reading out of data to the nonvolatile memory element of the nonvolatile memory unit 503. Specifically, the writing control signal EN_W and the reading control signal EN_R switch on/off of each switch or transistor included in the nonvolatile memory unit 503 to switch an electrical signal applied to the nonvolatile memory element, whereby writing or reading is performed.

Note that the writing control signal EN_W and the reading control signal EN_R are generated on the basis of a signal which is output from the control circuit 412 of the watchdog circuit 410. Therefore, saving of data from the volatile memory unit 502 to the nonvolatile memory unit 503 and return of the data from the nonvolatile memory unit 503 to the volatile memory unit 502 can be controlled depending on control of on/off of the sub-switch 202.

Next, a specific circuit configuration of the volatile memory unit 502 and the nonvolatile memory unit 503 included in the unit memory section 501 in FIG. 4A is illustrated in FIG. 4B.

FIG. 4B illustrates a flip-flop including a combination of inverters and clocked inverters, as a specific circuit configuration of the volatile memory unit 502. Note that in FIG. 4B, the clocked signal CLK is input to an inverter NV to generate an inverted clock signal. The inverted clock signal may be input from the outside.

Note that in FIG. 4B, in the case where data stored in the volatile memory unit 502 is written in the nonvolatile memory unit 503 to stop power supply to the register 500, the potential of a node Sig is sampled as data. In addition, in the case where the data stored in the nonvolatile memory unit 503 is read out to the volatile memory unit 502 to restart the power supply to the register 500, a potential corresponding to the data is output to a node Out.

The nonvolatile memory unit 503 illustrated in FIG. 4B includes a writing control circuit 511, a nonvolatile memory element 512, and a reading control circuit 513.

The writing control circuit 511 is a circuit for switching a signal which is output to the nonvolatile memory element 512 depending on the data stored in the volatile memory unit 502. Specifically, for example, in the case where the nonvolatile memory element 512 is a ReRAM, the writing control circuit 511 is a circuit for switching the polarity of a writing voltage which is applied to both ends of the ReRAM, depending on the data. The writing control circuit 511 is controlled by the writing control signal EN_W and the data.

Examples of the nonvolatile memory element 512 are a flash memory, a FeRAM, an MRAM, a PRAM, and a ReRAM. Alternatively, a nonvolatile memory element including a circuit which holds data by holding electrical charge using a transistor including an oxide semiconductor layer may be used.

The reading control circuit 513 is a circuit for switching a signal which is output to the volatile memory unit 502, depending on the data stored in the nonvolatile memory element 512. Specifically, for example, in the case where the nonvolatile memory element 512 is a ReRAM, a high resistance state and a low resistance state is switched, depending on the written data. The reading control circuit 513 is a circuit for extracting the data which is stored as the level of the resistance of the ReRAM as a voltage value using resistive division using a constant current source or a resistance element, by receiving the reading control signal EN_R.

Note that the register 500 described using FIG. 4A can hold data even when not powered. Therefore, power supply can be stopped intermittently without loss of data of the instruction register 403, the register group 406, and the arithmetic register 408 included in the data processor 400 described in FIG. 3. Therefore, power can be supplied only in a period which is necessary for data processing and the power supply can be stopped as appropriate in accordance with a status of use. Accordingly, the data processor 400 which can implement power gating using the power transistor 414 described in FIG. 3 can be achieved while keeping data processing capability.

<Operation of Nonvolatile Memory Unit>

Next, circuit operation of the nonvolatile memory unit 503 described in FIG. 4B included in the unit memory section 501 is described with reference to a timing chart.

Figure 5:
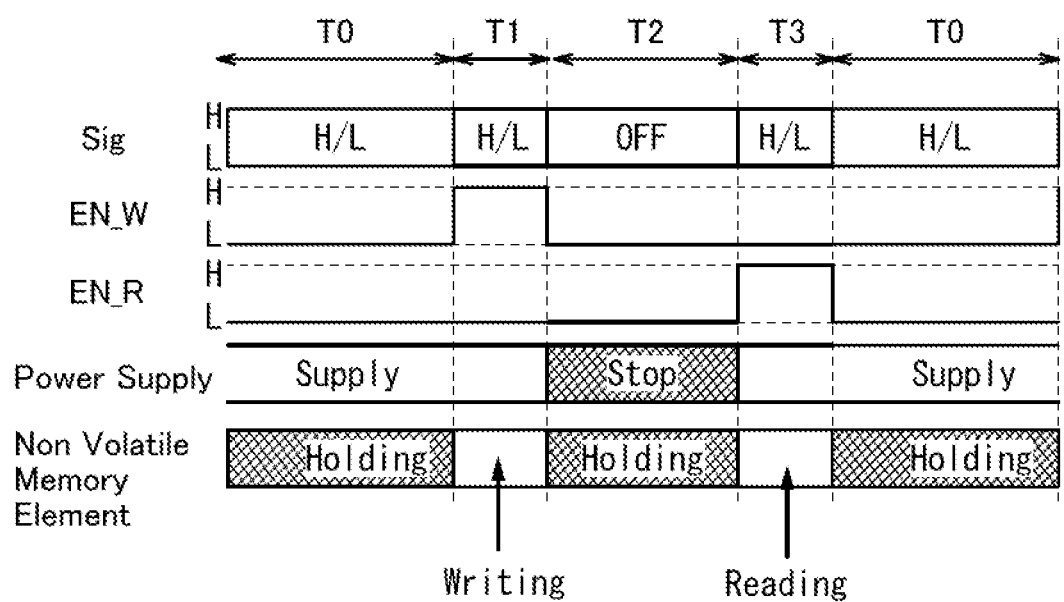
FIG. 5 is a timing chart showing operation of a volatile memory unit and a nonvolatile memory unit.

The timing chart in FIG. 5 shows the potential of the node Sig of the volatile memory unit 502 illustrated in FIG. 4B, the potential of the writing control signal EN_W, the potential of the reading control signal EN_R, the state of supply or stop of a power supply voltage, and a status of the nonvolatile memory element.

Note that in FIG. 5, the potential of each signal is denoted by two values, H level and L level. In addition, in FIG. 5, "H/L" in the node Sig indicates that the potential of data has a value of either H level or L level in a period in which the volatile memory unit 502 operates; "OFF" in the node Sig indicates the state in which no data is stored because power supply to the volatile memory unit 502 is stopped.

Furthermore, in FIG. 5, the reading control circuit 513 and the writing control circuit 511 are in an operation state when the writing control signal EN_W is at H level and/or when the reading control signal EN_R is at H level; the reading control circuit 513 and the writing control circuit 511 are in a non-operation state when the writing control signal EN_W is at L level and/or when the reading control signal EN_R is at L level.

In FIG. 5, as for the presence or absence of power supply, a period with power supply is denoted by "Supply", and a period without power supply is denoted by "Stop". Further, holding, writing, and reading data of the nonvolatile memory element are denoted by "Holding", "Writing", and "Reading", respectively.

A period T0 represents the one in which power is supplied to the register 500 and the volatile memory unit 502 operates to hold data. In the period T0, the writing control signal EN_W and the reading control signal EN_R are set to L level, whereby power supply performed. Note that the nonvolatile memory element holds data which has been written in the preceding period, which is denoted by "Holding" in the period T0.

A period T1 represents the one in which power is supplied to the register 500 and the data having H level or L level (H/L) which is held in the volatile memory unit 502 is written in the nonvolatile memory element. In the period T1, the writing control signal EN_W is set to H level and the reading control signal EN_R is set to L level, whereby power supply is performed. Note that in the period T1, data corresponding to the data held in the volatile memory unit 502 is written in the nonvolatile memory element.

A period T2 represents the one in which the nonvolatile memory element 512 holds the data which has been written in the period T1 and thus the data is not lost even the power supply to the register 500 is stopped. In the period T2, data is not input from the volatile memory unit 502 (OFF), and the writing control signal EN_W and the reading control signal EN_R are set to L level, whereby power supply is stopped. Note that the nonvolatile memory element holds the data which has been written in the period T1, which is denoted by "Holding" in the period T2.

A period T3 represents the one in which the power supply to the register 500 is restarted and the data having H level or L level (H/L) which has been written in the nonvolatile memory element is read out so as to be held again in the volatile memory unit 502. In the period T3, the data (H/L) which is read from the nonvolatile memory unit 503 is held in the volatile memory unit 502, the writing control signal EN_W is set to L level, and the reading control signal EN_R is set to H level, whereby power supply is performed. Note that the reading from the nonvolatile memory element is performed data corresponding to the data held in the nonvolatile memory unit 503 in the period T2.

This is the description of the timing chart showing the specific circuit operation of the nonvolatile memory unit 503 in FIG. 4B included in the unit memory section 501.

<Circuit Configuration of Nonvolatile Memory Element>

Next, an example of a possible circuit configuration of the nonvolatile memory element 512 in FIG. 4B is described with reference to FIGS. 6A and 6B.

Figure 6A:
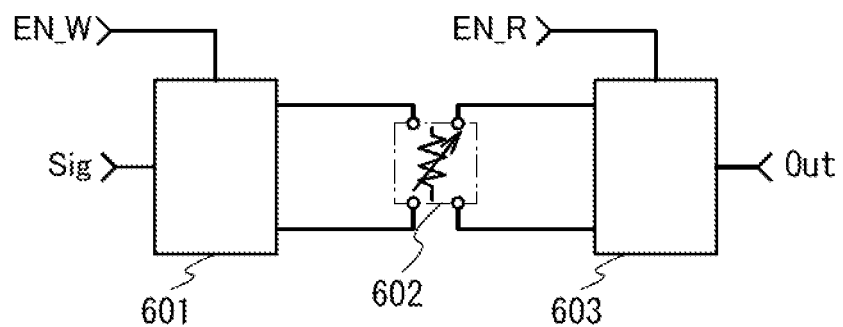
FIGS. 6A and 6B are circuit diagrams illustrating configuration examples of a nonvolatile memory unit.

FIG. 6A illustrates the case where a variable resistance memory element 602 is used as the nonvolatile memory element. The writing control signal EN_W and the potential of the node Sig which is data of the volatile memory unit 502 are input to a writing control circuit 601. Further, the reading control signal EN_R is input to a reading control circuit 603 and data corresponding to the level of the resistance value of the variable resistance memory element 602 is output to the node Out.

The writing control circuit 601 is a circuit for switching a signal which is output to the variable resistance memory element 602, depending on the potential of the node Sig. Specifically, in the case where the variable resistance memory element 602 is a ReRAM, the polarity of a writing potential applied to both ends of the variable resistance memory element 602 is switched depending on data. In the case where the variable resistance memory element 602 is an MRAM, the direction of a current flowing to the both ends is switched depending on the data.

The reading control circuit 603 is a circuit for switching a signal which is to be output to the volatile memory unit 502, depending on the data stored in the variable resistance memory element 602. Specifically, the data which is stored as the level of the resistance value of the variable resistance memory element 602 is extracted as a voltage value using a constant current source, a resistive dividing method with the use of a resistor, or the like.

Figure 6B:
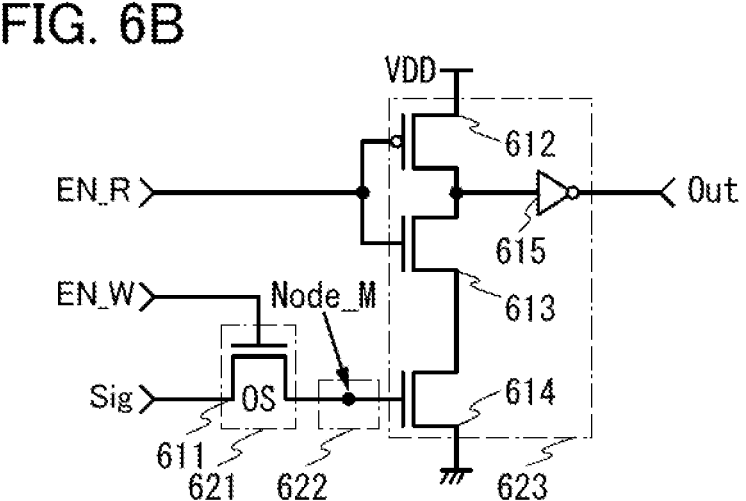

FIG. 6B is an example of a circuit which holds data by holding electrical charge using a transistor including an oxide semiconductor layer. The circuit illustrated in FIG. 6B includes a transistor including an oxide semiconductor layer (hereinafter referred to as an OS transistor 611), a p-channel transistor 612, an n-channel transistor 613, an n-channel transistor 614, and an inverter 615. In FIG. 6B, "OS" is written beside the OS transistor 611 in order to indicate that the OS transistor 611 includes an oxide semiconductor layer.

Here, an oxide semiconductor used for the semiconductor layer of the OS transistor 611 is described in detail.

At least indium (In) or zinc (Zn) is preferably contained as an oxide semiconductor used for a channel formation region in the semiconductor layer of the transistor. In particular, In and Zn are preferably contained. A stabilizer for strongly bonding oxygen is preferably contained in addition to In and Zn. As a stabilizer, at least one of gallium (Ga), tin (Sn), zirconium (Zr), hafnium (Hf), and aluminum (Al) may be contained.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, the following can be used, for example: an In—Sn—Ga—Zn-based oxide, an In—Ga—Zn-based oxide, an In—Sn—Zn-based oxide, an In—Zr—Zn-based oxide, an In—Al—Zn-based oxide, a Sn—Ga—Zn-based oxide, an Al—Ga—Zn-based oxide, a Sn—Al—Zn-based oxide, an In—Hf—Zn-based oxide, an In—La—Zn—based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide, an In-based oxide, a Sn-based oxide, or a Zn-based oxide.

Note that here, for example, an In—Ga—Zn-based oxide refers to an oxide mainly containing In, Ga, and Zn, and there is no limitation on the ratio of In to Ga and Zn.

Alternatively, a material represented by $InMO_3(ZnO)_m$ (m>0) may be used as an oxide semiconductor. Note that M represents one or more metal elements selected from Ga, Fe, Mn, and Co. Still alternatively, a material represented by $In_2SnO_5(ZnO)_n$ (n>0) may be used as an oxide semiconductor.

For example, an In—Ga—Zn-based oxide with an atomic ratio of In:Ga:Zn=3:1:2, 1:1:1, or 2:2:1, or an oxide whose atomic ratio is in the neighborhood of the above atomic ratios can be used. Alternatively, an In—Sn—Zn-based oxide with an atomic ratio of In:Sn:Zn=1:1:1, In:Sn:Zn=2:1:3, or In:Sn:Zn=2:1:5, or an oxide with an atomic ratio close to the above atomic ratios may be used.

Note that for example, the expression "the composition of an oxide including In, Ga, and Zn at the atomic ratio, In:Ga:Zn=a:b:c (a+b+c=1), is in the neighborhood of the composition of an oxide including In, Ga, and Zn at the atomic ratio, In:Ga:Zn=A:B:C (A+B+C=1)" means that a, b, and c satisfy Formula (1).

$$(a-A)^2+(b-B)^2+(c-C)^2 \le r^2 \quad (1)$$

For example, r may be 0.05. The same applies to other oxides.

However, the composition of the oxide semiconductor is not limited to those described above, and an oxide semiconductor having an appropriate composition may be used depending on necessary semiconductor characteristics (e.g., field-effect mobility or threshold voltage). In order to obtain the required semiconductor characteristics, it is preferable that the carrier concentration, the impurity concentration, the defect density, the atomic ratio between a metal element and oxygen, the interatomic distance, the density, and the like be set to appropriate values.

When an oxide semiconductor is highly purified, the off-state current of a transistor using such an oxide semiconductor for a channel formation region in a semiconductor layer can be sufficiently reduced (here, the off-state current means a drain current when a potential difference between a source and a gate is equal to or lower than the threshold voltage in the off state, for example). A highly purified oxide semiconductor can be obtained, for example, in such a manner that a film is deposited while heating is performed so as to prevent hydrogen and a hydroxyl group from being contained in the oxide semiconductor, or heat treatment is performed after film deposition so as to remove hydrogen and a hydroxyl group from the film. In the case where a highly purified In—Ga—Zn-based-oxide semiconductor is used for a channel region of a transistor having a channel length of 10 μm, a semiconductor film thickness of 30 nm, and a drain voltage of about 1 V to 10 V, the off-state current of the transistor can be reduced to $1\times10^{-13}$ A or less. In addition, the off-state current per channel width (the value obtained by dividing the off-state current by the channel width of the transistor) can be made about $1\times10^{-23}$ A/μm (10 yA/μm) to $1\times10^{-22}$ A/μm (100 yA/μm).

Figure 10:
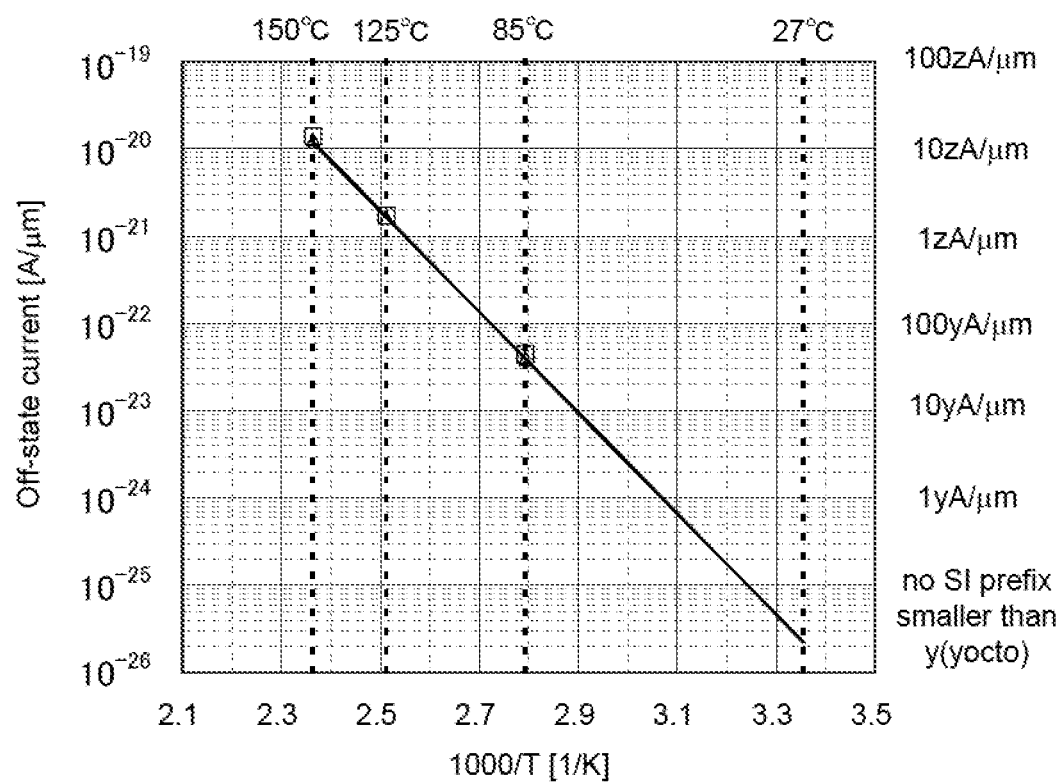
FIG. 10 is an Arrhenius plot diagram for showing off-state current.

In order to detect extremely low off-state current due to the use of a highly purified oxide semiconductor, a relatively large transistor is fabricated to measure the off-state current, whereby an off-state current that actually flows can be estimated. FIG. 10 shows an Arrhenius plot of the off-state current per channel width W of 1 μm of a large transistor having a channel width W of 1 m (1000000 μm) and a channel length L of 3 μm when the temperature changes to 150° C., 125° C., 85° C., and 27° C. As seen from FIG. 10, it is found that the off-state current is as extremely small as $3\times10^{-26}$ A/μm. The reason the off-state current is measured at elevated temperature is that a very low current at room temperature cannot be measured.

An oxide semiconductor film which is formed may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystalline oxide semiconductor). Further, an oxide semiconductor film including CAAC is referred to as a CAAC-OS film.

For example, an oxide semiconductor film may include a CAAC-OS. In the CAAC-OS, for example, c-axes are aligned, and a-axes and/or b-axes are not macroscopically aligned.

For example, an oxide semiconductor film may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example. Alternatively, a microcrystalline oxide semiconductor film, for example, includes a crystal-amorphous mixed phase structure where crystal parts (each of which is greater than or equal to 1 nm and less than 10 nm) are distributed.

For example, an oxide semiconductor film may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that an oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked structure including a region of an amorphous oxide semiconductor, a region of a microcrystalline oxide semiconductor, and a region of a CAAC-OS, for example.

Note that an oxide semiconductor film may be in a single-crystal state, for example.

An oxide semiconductor film preferably includes a plurality of crystal parts. In each of the crystal parts, a c-axis is preferably aligned in a direction parallel to a normal vector of a surface where the oxide semiconductor film is formed or a normal vector of a surface of the oxide semiconductor film. Note that, among crystal parts, the directions of the a-axis and the b-axis of one crystal part may be different from those of another crystal part. An example of such an oxide semiconductor film is a CAAC-OS film.

The CAAC-OS film is not absolutely amorphous. The CAAC-OS film, for example, includes an oxide semiconductor with a crystal-amorphous mixed phase structure where crystal parts and amorphous parts are intermingled. Note that in most cases, the crystal part fits inside a cube whose one side is less than 100 nm. In an image obtained with a transmission electron microscope (TEM), a boundary between an amorphous part and a crystal part and a boundary between crystal parts in the CAAC-OS film are not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

In a transistor using the CAAC-OS film, change in electric characteristics due to irradiation with visible light or ultraviolet light is small. Thus, the transistor has high reliability.

The above is the description of the oxide semiconductor used for the semiconductor layer of the OS transistor 611.

In the circuit illustrated in FIG. 6B, one of a source and a drain of the OS transistor 611 is connected to a wiring supplied with the potential of the node Sig that is the data of the volatile memory unit 502. A gate of the OS transistor 611 is connected to a wiring to which the writing control signal EN_W is input. The other of the source and the drain of the OS transistor 611 is connected to a gate of the n-channel transistor 614.

Note that a node where the other of the source and the drain of the OS transistor 611 and the gate of the n-channel transistor 614 are connected to each other is referred to as a node_M. Turning off the OS transistor 611 enables the node_M to hold electrical charge corresponding to the data of the volatile memory unit 502.

Note that it is preferable that the OS transistor 611 have a small drain current when the gate voltage is 0 V. In a manner similar to the off-state current, the drain current at this condition is preferably approximately $1 \times 10^{-23}$ A/μm (10 yA/μm) to $1 \times 10^{-22}$ A/μm (100 yA/μm). Therefore, it is preferable that the threshold voltage of the OS transistor 611 be positively shifted. Specifically, the positive shift of the threshold voltage can be achieved in such a manner that a back gate electrode is provided in the OS transistor and a negative bias is applied to a channel formation region of the OS transistor.

In the circuit illustrated in FIG. 6B, one of a source and a drain of the p-channel transistor 612 is connected to a wiring supplied with the high power supply potential VDD. A gate of the p-channel transistor 612 is connected to a wiring to which the reading control signal EN_R is input. The other of the source and the drain of the p-channel transistor 612 is connected to one of a source and a drain of the n-channel transistor 613.

In the circuit illustrated in FIG. 6B, a gate of the n-channel transistor 613 is connected to the wiring to which the reading control signal EN_R is input. The other of the source and the drain of the n-channel transistor 613 is connected to one of a source and a drain of the n-channel transistor 614.

In the circuit illustrated in FIG. 6B, the other of the source and the drain of the n-channel transistor 614 is connected to a ground line.

In the circuit illustrated in FIG. 6B, an input terminal of the inverter 615 is connected to the other of the source and the drain of the p-channel transistor 612 and the one of the source and the drain of the n-channel transistor 613. An output terminal of the inverter 615 is connected to the node Out.

In the circuit illustrated in FIG. 6B, the OS transistor 611 is a writing control circuit 621, the node_M is a nonvolatile memory element 622, and the p-channel transistor 612, the n-channel transistor 613, the n-channel transistor 614, and the inverter 615 are a reading control circuit 623. In other words, the writing control circuit 621 holds electrical charge in the node_M that is the nonvolatile memory element 622, in accordance with the writing control signal EN_W. The reading control circuit 623 can output a signal in accordance with the data to the node OUT, depending on the electrical charge held in the nonvolatile memory element 622.

<Operation of Power Supply Control Device>

Figure 7:
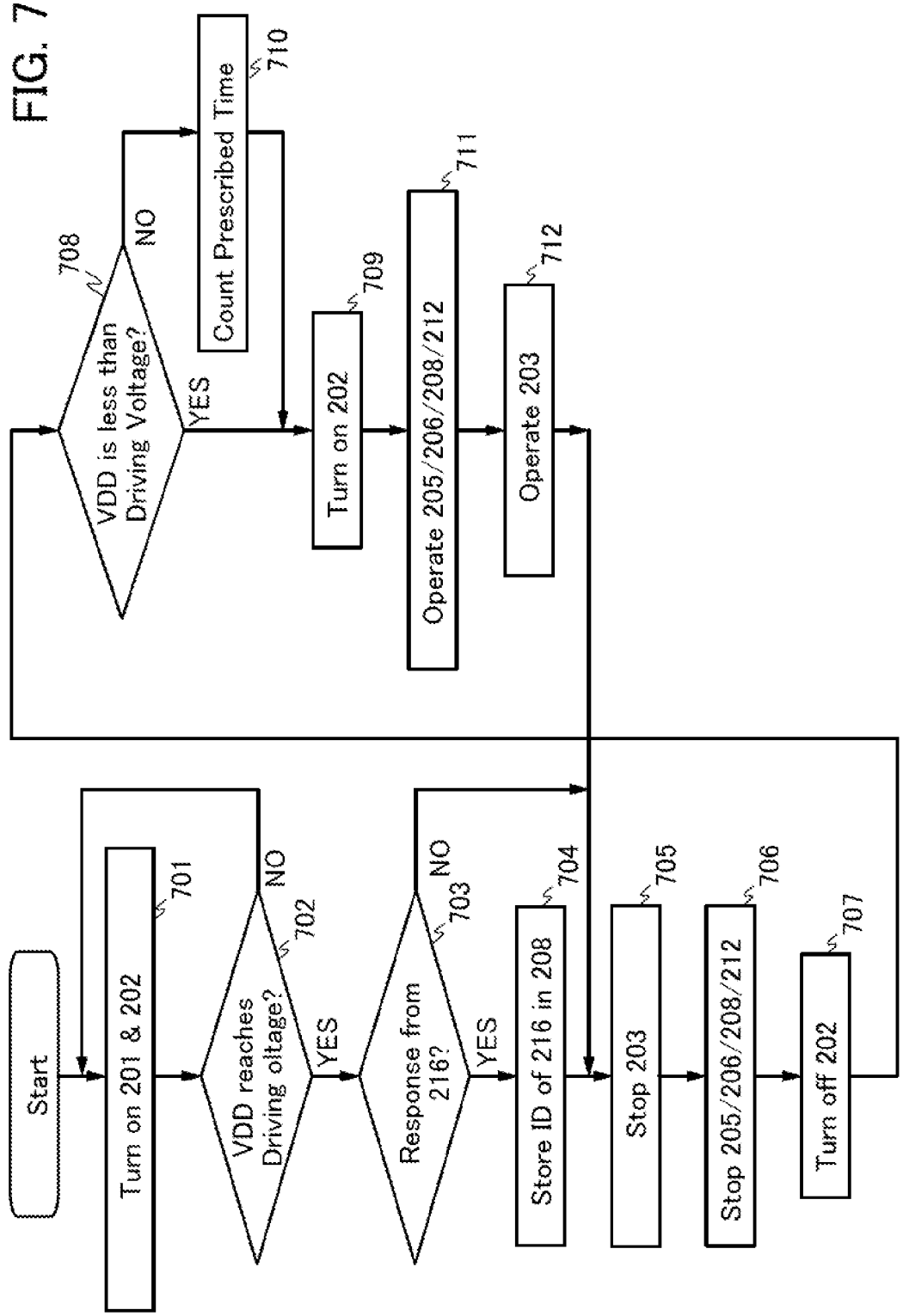
FIG. 7 is a flowchart for showing operation of a power supply control device.

Next, FIG. 7 shows a flowchart showing an example of the operation of the power supply control device 200 in FIG. 2.

First, in Step 701, both the main switch 201 and the sub-switch 202 of the power supply control device 200 are turned on. Therefore, power is supplied to the external device 216 and thus the potential of the one electrode of the capacitor 207 (on the VDD side in FIG. 2) is increased.

In Step 702, it is determined whether or not the potential of the one electrode of the capacitor 207 reaches a voltage at which the data processing device 203 can operate (driving voltage). When the potential of the one electrode of the capacitor 207 reaches the driving voltage of the data processing device 203, it proceeds to the next Step 703; when it does not reach the driving voltage, Step 701 is repeated.

In Step 703, it is determined whether or not response of a signal is given from the external device 216 to the signal detection circuit 213 by power supply to the external device 216. The signal from the external device 216, which is received by the signal detection circuit 213, is an identification data (ID) and the like of the external device 216. In the case where the response of the signal is given from the external device to the signal detection circuit 213, it proceeds to the next Step 704; in the case where the response is not given, the next Step 704 is skipped and it proceeds to Step 705.

In Step 704, when the signal from the external device 216, which is received by the signal detection circuit 213, is an identification data of the external device 216, the identification data is stored in the nonvolatile memory 208. It is possible that in the case where the signal from the external device 216, which is received by the signal detection circuit 213, is a new identification data, writing of the data is performed while in the case where the signal is the identification data which has already been stored, writing of the data is not performed and a signal indicating that response of a signal to the signal detection circuit 213 is unnecessary may be sent to the external device 216.

In Step 705, the data processing device 203 is stopped. By the processing, the power supply to the data processing device 203 via the sub-switch 202 is stopped. Accordingly, standby power when the data processing device 203 does not operate can be eliminated. Note that the power supply can be stopped without loss of the data by saving the data of the volatile memory unit 209 to the nonvolatile memory unit 210 in the data processing device 203 before the sub-switch 202 is turned off, as described above. Accordingly, intermittent power supply is performed, whereby power consumption can be reduced without lowering the function of the data processing device 203.

In Step 706, control of the AC/DC converter 205, the DC/DC converter 206, the nonvolatile memory 208, and the current detection circuit 212 is stopped. Specifically, the power transistor is turned off by power gating control for each circuit.

In Step 707, the sub-switch 202 is turned off.

Since the sub-switch 202 is turned off, the potential of the one electrode of the capacitor 207 starts to decrease. In Step 708, it is determined whether or not the potential of the one electrode of the capacitor 207, which is obtained after the sub-switch 202 is turned off, is reduced to lower than the driving voltage. When the potential of the one electrode of the capacitor 207 is reduced to lower than the driving voltage, it proceeds to the next Step 709; when the potential is not reduced to less than or equal to the driving voltage, it proceeds to Step 710.

In the step 709, the sub-switch 202 is turned on. Since the sub-switch 202 is turned on, the potential of the one electrode of the capacitor 207 is increased to reach a voltage at which the data processing device 203 can operate (driving voltage).

In Step 710, prescribed time is counted in the watchdog circuit that is the timer circuit 211. After the prescribed time, it proceeds to Step 709.

In Step 711, the AC/DC converter 205, the DC/DC converter 206, the nonvolatile memory 208, and the current detection circuit 212 is resumed (operated). Specifically, the power transistor is turned on by power gating control for each circuit.

In Step 712, the data processing device 203 is operated. By the processing, the data of the nonvolatile memory unit 210 can be returned to the volatile memory unit 209 in the data processing device 203 as described above, so that arithmetic processing can be restarted without loss of the data.

After Step 712 is performed and arithmetic processing is performed again, the process returns to Step 706 and loop processing of the above steps is performed.

Figure 8:
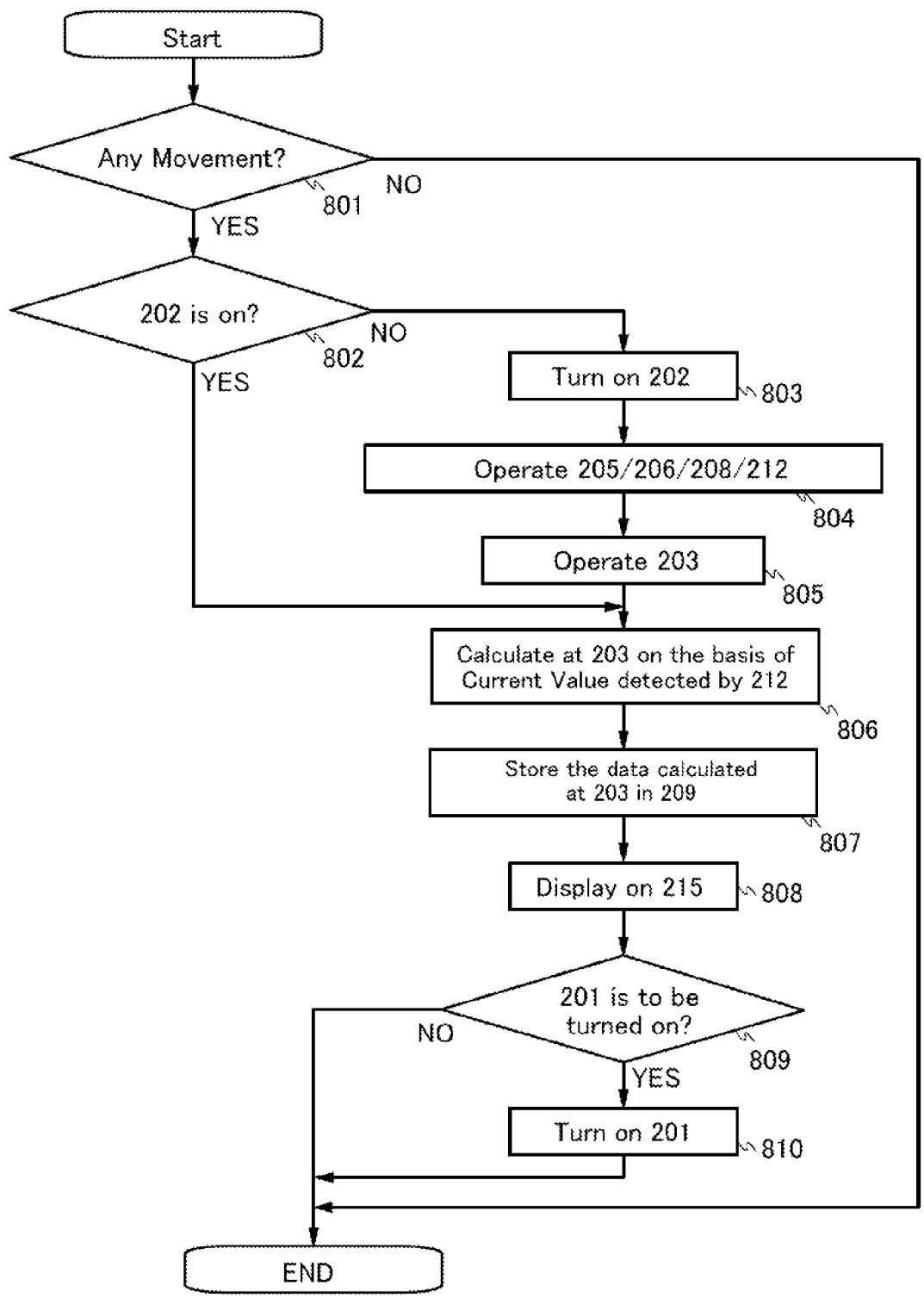
FIG. 8 is a flowchart for showing operation of a power supply control device.
Figure 9:
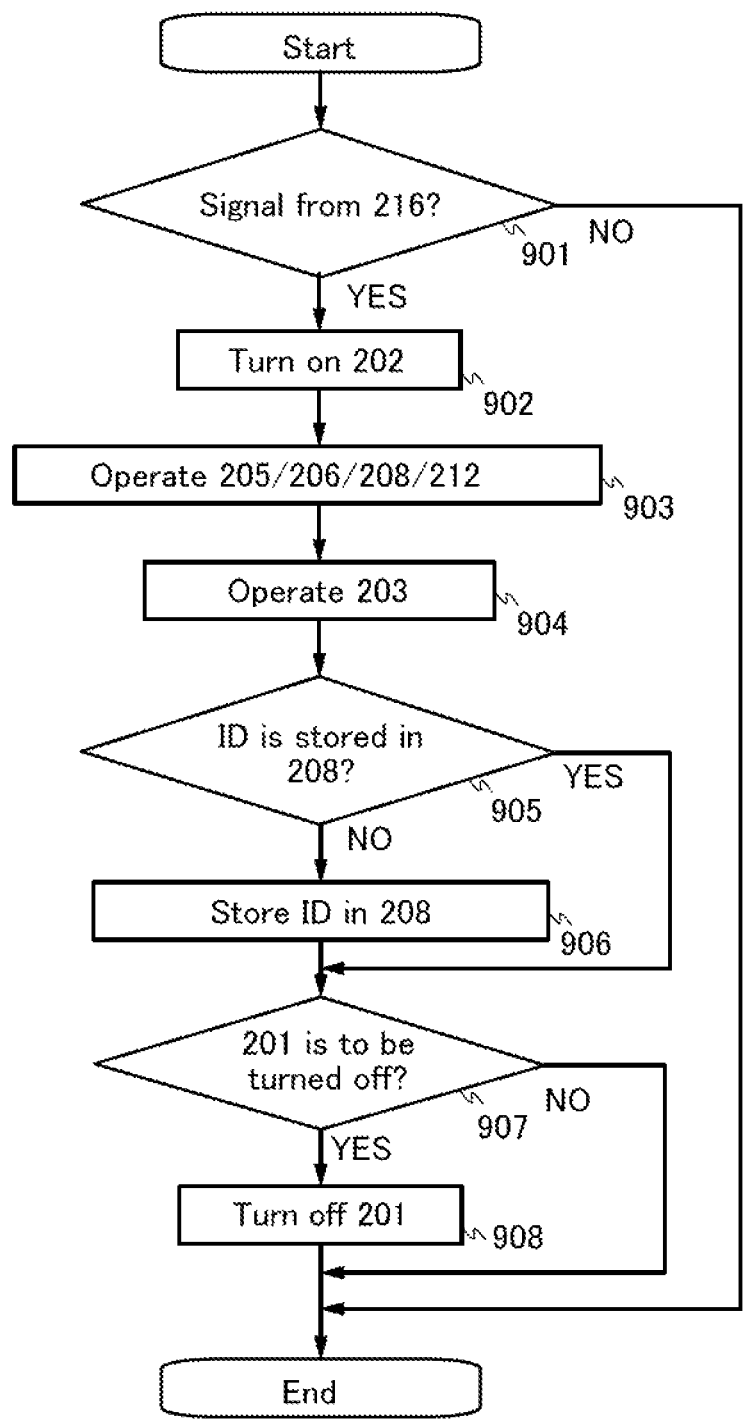
FIG. 9 is a flowchart for showing operation of a power supply control device.

Next, an interrupt processing between the Steps 706 to 712 by the signal detection circuit 213 and the human sensor circuit 214 is described using flowcharts of FIG. 8 and FIG. 9.

FIG. 8 is a flowchart in the case where the interrupt processing occurs due to a signal obtained in the human sensor circuit 214. The flowchart in FIG. 8 shows the processing which starts between any steps of Steps 706 to 712 described with reference to FIG. 7. Note that after reaching the end of the flowchart shown in FIG. 8, it proceeds to Step 705 shown in FIG. 7, and the loop processing of the steps is executed from Step 705 as a start point.

First, in Step 801, the human sensor circuit 214 determines whether or not there is movement in the periphery thereof. In the case where the human sensor circuit 214 detects movement in the periphery thereof, it proceeds to the next Step 802; in the case where the human sensor circuit 214 does not detect the movement, it proceeds to the end. Note that the detection of the movement in the periphery varies depending on a sensor included in the human sensor circuit 214; specifically, in the case where a vibration sensor is used as the sensor, vibration due to a movement of a person is detected as an electric signal.

In Step 802, it is determined whether or not the sub-switch 202 is on. When the sub-switch 202 is on, it proceeds to Step 806; when the sub-switch 202 is off, it proceeds to Step 803.

In Step 803, the sub-switch 202 is turned on.

In Step 804, the AC/DC converter 205, the DC/DC converter 206, the nonvolatile memory 208, and the current detection circuit 212 is operated. Specifically, the power transistor is turned on by power gating control for each circuit.

In Step 805, the data processing device 203 is operated. By the processing, the data of the nonvolatile memory unit 210 can be returned to the volatile memory unit 209 in the data processing device 203 as described above, so that arithmetic processing can be restarted without loss of the data In Step 806, the data processing device 203 multiplies a voltage value and time on the basis of the current value detected by the current detection circuit 212 to calculate the power consumption of the external device 216. Further, in the case where power consumption in the preceding period is stored in the data processing device 203, it is possible to calculate the amount of a change in the power consumption. Note that in Step 806, in the case where the main switch 201 is on, the power consumption of the external device 216 is estimated by performing arithmetic processing on the basis of the current value which is detected in the current detection circuit 212; in the case where the main switch 201 is off, the power consumption is estimated to be substantially zero.

In Step 807, data of the power consumption obtained by the arithmetic operation in Step 806 is stored in the volatile memory unit 209 of the data processing device 203.

In Step 808, the data of the power consumption stored in Step 807 is displayed on the display portion 215.

In Step 809, it is determined whether or not the main switch 201 is to be turned on because of the detection of the movement in the periphery by the human sensor circuit 214. In the case where the main switch 201 is to be turned on, it proceeds to the next Step 810; in the case where the main switch 201 is not to be turned on, it proceeds to Step 705 in FIG. 7.

In Step 810, the main switch 201 is turned on. After Step 810, it proceeds to the end and returns to Step 705 in FIG. 7.

The above is the description of the flowchart in the case where the interrupt processing occurs due to a signal obtained in the human sensor circuit 214.

Next, FIG. 9 is a flowchart in the case where an interrupt processing occurs due to a signal obtained in the signal detection circuit 213. The flowchart in FIG. 9 shows the processing which starts between any steps of Steps 706 to 712 described with reference to FIG. 7. Note that after reaching the end of the flowchart shown in FIG. 9, it proceeds to Step 705 shown in FIG. 7, and the loop processing of the steps is executed from Step 705 as a start point.

First, in Step 901, it is determined whether or not the signal detection circuit 213 receives a signal from the external device 216. In the case where the signal detection circuit 213 receives the signal from the external device 216, it proceeds to the next Step 902; in the case where the signal detection circuit 213 does not receive the signal, it proceeds to the end. Note that the signal from the external device 216 may be sent to the signal detection circuit 213, for example, when the external device 216 is not used in a certain period.

In Step 902, the sub-switch 202 is turned on.

In Step 903, the AC/DC converter 205, the DC/DC converter 206, the nonvolatile memory 208, and the current detection circuit 212 is operated. Specifically, the power transistor is turned on by power gating control for each circuit.

In Step 904, the data processing device 203 is operated. By the processing, the data of the nonvolatile memory unit 210 can be returned to the volatile memory unit 209 in the data processing device 203 as described above, so that arithmetic processing can be restarted without loss of the data.

In Step 905, it is determined whether or not identification data corresponding to the signal which the signal detection circuit 213 has received from the external device 216 is stored in the nonvolatile memory 208. In the case where the identification data is not stored in the nonvolatile memory 208, it proceeds to the Step 906; in the case where the identification data is stored in the nonvolatile memory 208, Step 906 is skipped and it proceeds to Step 907.

In Step 906, in the case where the signal which the signal detection circuit 213 has received from the external device 216 is an identification data which is not stored in the nonvolatile memory 208, the identification data is stored in the nonvolatile memory 208.

In Step 907, it is determined whether or not the main switch 201 is to be turned off. The determination is made in the case where the signal is sent from the external device 216 to the signal detection circuit 213 when the external device 216 is not used in the certain period. In the case where the main switch 201 is to be turned off, it proceeds to the next Step 908; in the case where the main switch 201 is not to be turned off, it proceeds to the end and returns to Step 705 in FIG. 7.

In the step 908, the main switch 201 is turned off After Step 908 is performed, it proceeds to the end and returns to Step 705 of FIG. 7.

The above is the description of the flowchart in the case where the interrupt processing occurs due to a signal obtained in the signal detection circuit 213.

In the power supply control device of one embodiment described above, the signal detection circuit which detects the signal from the external device and the human sensor circuit are included, and the main switch and the sub-switch can be turned on when it is necessary to supply power to the external device. Therefore, the data processing device can perform operation such as power supply to the external device or power supply to the data processing device, as necessary, whereby power consumption can be reduced by a reduction in standby power of the external device and an intermittent stop of power supply in the data processing device.

This embodiment can be implemented by being combined as appropriate with the above embodiment.

EXPLANATION OF REFERENCE

D_n: data; D_1: data; Q_n: data; Q1: data; T0: period; T1: period; T2: period; T3: period; W1: channel width; INV: inverter; 100: power supply control device; 101: main switch; 102: sub-switch; 103: data processing device; 104: rectifier circuit; 105: AC/DC converter; 106: DC/DC converter; 107: capacitor; 108: nonvolatile memory; 109: volatile memory unit; 110: nonvolatile memory unit; 200: power supply control device; 201: main switch; 202: sub-switch; 203: data processing device; 204: rectifier circuit; 205: AC/DC converter; 206: DC/DC converter; 207: capacitor; 208: nonvolatile memory; 209: volatile memory unit; 210: nonvolatile memory unit; 211: timer circuit; 212: current detection circuit; 213: signal detection circuit; 214: human sensor circuit; 215: display portion; 216: external device; 400: data processor; 401: address management section; 402: program memory; 403: instruction register; 404: instruction decoder; 405: control section; 406: register group; 407: ALU; 408: arithmetic register; 410: watchdog circuit; 411: counter circuit; 412: control circuit; 413: voltage monitor circuit; 414: power transistor; 500: register; 501: unit memory section; 502: volatile memory unit; 503: nonvolatile memory unit; 511: control circuit; 512: nonvolatile memory element; 513: control circuit; 601: control circuit; 602: variable resistance memory element; 603: control circuit; 611: OS transistor; 612: p-channel transistor; 613: n-channel transistor; 614: n-channel transistor; 615: inverter; 621: control circuit; 622: nonvolatile memory element; 623: control circuit.

This application is based on Japanese Patent Application serial No. 2012-076764 filed with Japan Patent Office on Mar. 29, 2012, the entire contents of which are hereby incorporated by reference.

The invention claimed is:

1. A power supply control device comprising:
a data processing device including a volatile memory unit and a nonvolatile memory unit;
a first switch supplying power to an external device in response to control by the data processing device; and
a second switch supplying power to the data processing device in response to control by the data processing device,
wherein the data processing device is configured to control the first switch in accordance with a status of use of the external device, and
wherein the data processing device turns on the second switch in a period in which data is stored in the volatile memory unit, and turns off the second switch in a period in which data is stored in the nonvolatile memory unit.

2. The power supply control device according claim 1, further comprising a timer circuit,
wherein the data processing device turns on the second switch in response to a signal from the timer circuit.

3. The power supply control device according to claim 1, further comprising:
a signal detection circuit detecting a signal from the external device;
a human sensor circuit; and
a nonvolatile memory for storing information of the external device,
wherein the nonvolatile memory is a circuit storing the signal from the external device that is detected in the signal detection circuit, and
wherein the data processing device turns on the second switch in response to a signal from the signal detection circuit or the human sensor circuit.

4. The power supply control device according to claim 1, wherein a rectifier circuit, an AC/DC converter, and a DC/DC converter are provided between the second switch and the data processing device.

5. The power supply control device according to claim 4, wherein the data processing device turns off the second switch and performs control so as to stop operation of the AC/DC converter and operation of the DC/DC converter in the period in which data is stored in the nonvolatile memory unit.

6. The power supply control device according to claim 4, wherein a capacitor is electrically connected to a wiring positioned between the DC/DC converter and the data processing device,
wherein the data processing device includes a voltage monitor circuit detecting a potential of the wiring to which the capacitor is connected, and
wherein the voltage monitor circuit turns on the second switch depending on a potential which the voltage monitor circuit detects.

7. The power supply control device according to claim 1, wherein the nonvolatile memory unit includes a circuit that holds the data by holding electrical charge using a transistor including an oxide semiconductor layer.

8. A power supply control device comprising:
a data processing device including a first memory unit and a second memory unit;
a first switch supplying power to an external device in response to control by the data processing device; and
a second switch supplying power to the data processing device in response to control by the data processing device,
wherein data is held in the second memory unit when not powered,
wherein the data processing device is configured to control the first switch in accordance with a status of use of the external device, and
wherein the data processing device turns on the second switch in a period in which data is stored in the first memory unit, and turns off the second switch in a period in which data is stored in the second memory unit.

9. The power supply control device according claim 8, further comprising a timer circuit,
wherein the data processing device turns on the second switch in response to a signal from the timer circuit.

10. The power supply control device according to claim 8, further comprising:
a signal detection circuit detecting a signal from the external device;
a human sensor circuit; and
a memory for storing information of the external device,
wherein data is held in the memory when not powered,
wherein the memory is a circuit storing the signal from the external device that is detected in the signal detection circuit, and
wherein the data processing device turns on the second switch in response to a signal from the signal detection circuit or the human sensor circuit.

11. The power supply control device according to claim 8, wherein a rectifier circuit, an AC/DC converter, and a DC/DC converter are provided between the second switch and the data processing device.

12. The power supply control device according to claim 11, wherein the data processing device turns off the second switch and performs control so as to stop operation of the AC/DC converter and operation of the DC/DC converter in the period in which data is stored in the second memory unit.

13. The power supply control device according to claim 11,
wherein a capacitor is electrically connected to a wiring positioned between the DC/DC converter and the data processing device,
wherein the data processing device includes a voltage monitor circuit detecting a potential of the wiring to which the capacitor is connected, and
wherein the voltage monitor circuit turns on the second switch depending on a potential which the voltage monitor circuit detects.

14. The power supply control device according to claim 8, wherein the second memory unit includes a circuit that holds the data by holding electrical charge using a transistor including an oxide semiconductor layer.

15. A power supply control device comprising:
a data processing device including a memory unit;
a memory for storing information of an external device;
a first switch supplying power to the external device in response to control by the data processing device; and
a second switch supplying power to the data processing device in response to control by the data processing device,
wherein the memory includes a circuit that holds data by holding electrical charge using a transistor including an oxide semiconductor layer,
wherein data is held in the memory when not powered,
wherein the memory is configured to store a signal from the external device,
wherein the data processing device is configured to control the first switch in accordance with a status of use of the external device, and
wherein the data processing device turns on the second switch in a period in which data is stored in the memory unit.

16. The power supply control device according claim 15, further comprising a timer circuit,
wherein the data processing device turns on the second switch in response to a signal from the timer circuit.

17. The power supply control device according to claim 15, further comprising:
a signal detection circuit detecting the signal from the external device; and
a human sensor circuit,
wherein the data processing device turns on the second switch in response to a signal from the signal detection circuit or the human sensor circuit.

18. The power supply control device according to claim 15, wherein a rectifier circuit, an AC/DC converter, and a DC/DC converter are provided between the second switch and the data processing device.

19. The power supply control device according to claim 18, wherein the data processing device turns off the second switch and performs control so as to stop operation of the AC/DC converter and operation of the DC/DC converter in the period in which data is not stored in the memory unit.

20. The power supply control device according to claim 18,
wherein a capacitor is electrically connected to a wiring positioned between the DC/DC converter and the data processing device,
wherein the data processing device includes a voltage monitor circuit detecting a potential of the wiring to which the capacitor is connected, and
wherein the voltage monitor circuit turns on the second switch depending on a potential which the voltage monitor circuit detects.

* * * * *